United States Patent
Coviello

(10) Patent No.: US 9,925,604 B1
(45) Date of Patent: Mar. 27, 2018

(54) AUTOMATED DIN RAIL SHEAR SYSTEM

(71) Applicant: Design Ready Controls, Inc., Brooklyn Park, MN (US)

(72) Inventor: Mario Daniel Coviello, Brooklyn Park, MN (US)

(73) Assignee: Design Ready Controls, Inc., Brooklyn Park, MN (US)

( * ) Notice: Subject to any disclaimer, the term of this patent is extended or adjusted under 35 U.S.C. 154(b) by 0 days.

(21) Appl. No.: 15/371,697

(22) Filed: Dec. 7, 2016

(51) Int. Cl.
*B23D 33/00* (2006.01)
*B23D 23/00* (2006.01)
*B23D 33/02* (2006.01)

(52) U.S. Cl.
CPC ........... *B23D 33/006* (2013.01); *B23D 23/00* (2013.01); *B23D 33/02* (2013.01)

(58) Field of Classification Search
CPC ....... B23D 33/006; B23D 33/02; B23D 23/00
See application file for complete search history.

(56) References Cited

U.S. PATENT DOCUMENTS

| | | | | |
|---|---|---|---|---|
| 2,355,320 A * | 8/1944 | Nebel | ................ | B23D 17/08 83/605 |
| 3,457,818 A * | 7/1969 | McManus | .............. | B23D 17/08 83/599 |
| 3,714,856 A * | 2/1973 | Hall | ................ | B23D 17/08 83/453 |
| 4,364,292 A * | 12/1982 | Wozniak | ............... | B23D 17/08 83/605 |
| 4,576,380 A * | 3/1986 | Shields | .................. | B22D 31/00 225/104 |
| 5,533,791 A * | 7/1996 | Boucherie | ................ | A46D 3/08 264/243 |
| 5,775,955 A * | 7/1998 | Graube | ................ | H01R 9/2408 439/716 |
| 5,793,050 A * | 8/1998 | Rose | ..................... | H01J 27/14 250/441.11 |
| 5,934,166 A * | 8/1999 | Herlihy | .................. | B23D 17/08 83/605 |
| 7,219,586 B1 * | 5/2007 | Daniels | .................. | B23D 29/02 83/465 |
| 2006/0156882 A1 * | 7/2006 | Kollman | ................ | B23D 23/00 83/167 |
| 2007/0169601 A1 * | 7/2007 | Yu | .......................... | B23D 23/00 83/452 |
| 2007/0275639 A1 * | 11/2007 | Miyashita | ............. | B24B 37/345 451/11 |
| 2009/0030542 A1 * | 1/2009 | Lindstrom | ......... | G05B 19/4189 700/113 |
| 2009/0071307 A1 * | 3/2009 | Kollman | ................ | B23D 23/00 83/468.2 |
| 2009/0078101 A1 * | 3/2009 | Nien | ...................... | B23D 23/00 83/468 |
| 2010/0313726 A1 * | 12/2010 | Lee | ........................ | B23D 23/00 83/200 |

(Continued)

*Primary Examiner* — Sean Michalski
(74) *Attorney, Agent, or Firm* — Haugen Law Firm PLLP

(57) ABSTRACT

An apparatus is described that is suitable for automated manufacture of electrical control panel DIN rails. The apparatus is directed to an automated assembly that shears multiple DIN rail blanks at varying lengths without a need to manually feed DIN rail blanks through a cutter. The apparatus is particularly well suited for use in an automated assembly of electrical control panels that require customized lengths of significant quantities of DIN rail.

19 Claims, 26 Drawing Sheets

(56) References Cited

U.S. PATENT DOCUMENTS

| | | | |
|---|---|---|---|
| 2013/0011227 A1* | 1/2013 | Pietsch | B65G 47/5127 414/277 |
| 2015/0038062 A1* | 2/2015 | Umeda | H01L 21/67219 451/70 |
| 2015/0166273 A1* | 6/2015 | Price | H01J 37/20 414/225.01 |
| 2016/0059375 A1* | 3/2016 | Ito | B24B 37/013 382/141 |
| 2016/0343599 A1* | 11/2016 | Nakamura | H01L 21/67778 |

* cited by examiner

AUTOMATED DIN RAIL SHEAR SYSTEM

CROSS-REFERENCE TO RELATED APPLICATIONS

Not Applicable.

FEDERAL SPONSORSHIP

Not Applicable

JOINT RESEARCH AGREEMENT

Not Applicable

TECHNICAL FIELD

This invention pertains generally to a system to shear a desired length of a DIN rail blank used in electrical control panels. More particularly, the present invention is directed to an automated assembly that shears multiple DIN rail blanks at varying lengths without a need to manually feed DIN rail blanks through a cutter. The shear system of the present invention is particularly well suited for use in an automated assembly of electrical control panels that require customized lengths of significant quantities of DIN rail.

BACKGROUND

Over the years, electrical control panel and wiring schematic designs have been incorporated into many tools, equipment, and machinery. These electrical control panels are often customized to minimize the size of the panel while maximizing connectivity within the panel. A metal rail has been used for mounting circuit breakers and other electrical equipment within the control panels. The metal rail has been standardized and the Deutsches Institut für Normung (DIN) is believed to have first published specifications for a standardized metal rail. The industry commonly refers to a standard electrical control panel mounting rail as "DIN rail." The DIN rail is a standard profile common to most manufacturers and is used extensively in industrial control panels as the primary mounting method for components (relays, circuit breakers, terminals, etc.). The cross-section profile of the DIN rail is formed in metal machines and shipped to consumers or electrical control panel manufacturers, in two meter standard lengths or blanks. The blanks must then be cut to a desired length for mounting in specific locations within the panel.

Various methods have been devised to cut the metal DIN rail to a desired length. Typically, the DIN rail is manually cut or manually fed into a cutting mechanism. When a part list is provided, the cutting requires individual measurement and the additional handling of the DIN rail consumes time and requires additional labor. The shortcomings of manual assembly may be overcome with the use of a programmable interface, however, even a programmable interface requires manual input of individual blanks into the interface.

SUMMARY

Embodiments according to aspects of the invention provide an apparatus to automatically and repetitively shear multiple DIN rails to selected lengths without the need for manual intervention. The apparatus according to aspects of the invention generally includes a shear die assembly, a shear actuator, a cassette, motors, a DIN rail advancer, and a DIN rail feed assembly. The shear die assembly generally includes a die plate, a shear plate (cutter, punch, or cutter punch), and an actuator that actuates the shear plate to an open position. The shear actuator may comprise a hydraulic cylinder that is paired with the shear die assembly to actuate the shear plate of the shear die assembly to the shearing position. When the hydraulic cylinder is withdrawn, the actuator actuates the shear plate to the open position. Alternatively, a two way hydraulic cylinder may be utilized to actuate the shear plate to both the open position and shearing position. The cassette includes multiple slots to retain at least two DIN rail blanks having a length of 2 meters or more. The motor is servo driven and is coupled to the cassette to rotate and index the cassette. The DIN rail advancer may be of an air cylinder or hydraulic type and is positioned to advance DIN rail from the cassette towards the die plate of the shear die assembly. The DIN rail feed assembly may include a roller cog assembly that feeds the DIN rail through the die plate in controlled and metered amounts.

According to other aspects of the invention the apparatus may be mounted to a frame having first and second spaced apart base sections. Further, the shear die assembly may be supported by the first base section and the servo motor may be supported by the second base. The cassette may include an enclosure that surrounds or encompasses the DIN rail cassette to reduce exposure when the cassette is indexed and the DIN rail within the cassette rotate. The enclosure may further have a cover that slides between an open and closed position to allow access to the cassette or further block the cassette from the external environment. Both the indexing and the advancement of the DIN rail by the DIN rail advancer may be automated and controlled with a preprogrammed controller. At the output side of the shear die assembly, a funnel tray may be coupled adjacent the shear die assembly to direct sheared DIN rail away from the shear die assembly.

In use, the cover of the enclosure is opened and the cassette is loaded with DIN rail blanks. The cassette may be rotated or indexed to allow easy access to each DIN rail slot of the cassette. Once the cassette is loaded, the user may utilize a controller to preset the quantity and desired lengths of the DIN rail to be cut. The controller then controls the servo motor, Din rail advancer, hydraulic shear actuator, and Din rail feed to advance a length of DIN rail blank from the cassette through a die of a shear die assembly, the control then sends a signal to the shear actuator to engage or actuate the shear plate. Once the DIN rail blank is sheared the hydraulic actuator retracts and the shear assembly opens to allow advancement of DIN rail blank to a next desired length for shearing. The assembly autonomously advances the DIN rail blank and shears the DIN rail blank until a preselected number of DIN rail blanks are sheared. The controller may further control the advancement of DIN rail blanks by variable amounts to allow varied lengths of DIN rail blanks to pass through the shear die assembly prior to shearing the blank. A further aspect of the invention utilizes and controls a cog assembly to advance the DIN rail blank a desired amount through the shear die assembly.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The automated DIN rail shear system of the present invention includes a storage cassette that provides for automated loading and removal of DIN rail blanks. The DIN rail blanks automatically advance from the storage cassette into an automated shear assembly. The amount of rail advanced through the shear assembly is controlled so that custom lengths of rail are sheared and automatically discharged into a finish receptacle. The automated system further provides automated shearing of bulk amounts of DIN rail blanks without user intervention. The cassette includes multiple slots to retain at least two DIN rail blanks having a length of 2 meters or more. The system generally includes a support or framework, a storage cassette, a shear die assembly, a shear actuator, a DIN rail advancer, and a DIN rail feed assembly. DIN rail advances DIN rail blank from the cassette to the DIN rail feed assembly. The blank is then advanced to the shear assembly. The shear assembly generally includes a die plate, a shear plate (cutter, punch, or cutter punch), and a compression spring that actuates the shear plate to an open position. A shear actuator may comprise a hydraulic cylinder that is paired with the shear assembly to actuate the shear plate of the shear die assembly to a shearing position. When the hydraulic cylinder is withdrawn, the compression spring actuates the shear plate to the open position. Alternatively, a two way hydraulic cylinder may be utilized to actuate the shear plate to both the open position and shearing position. Turning attention now to the Figures, embodiments according to aspects of the invention will now be described.

Figure 1:
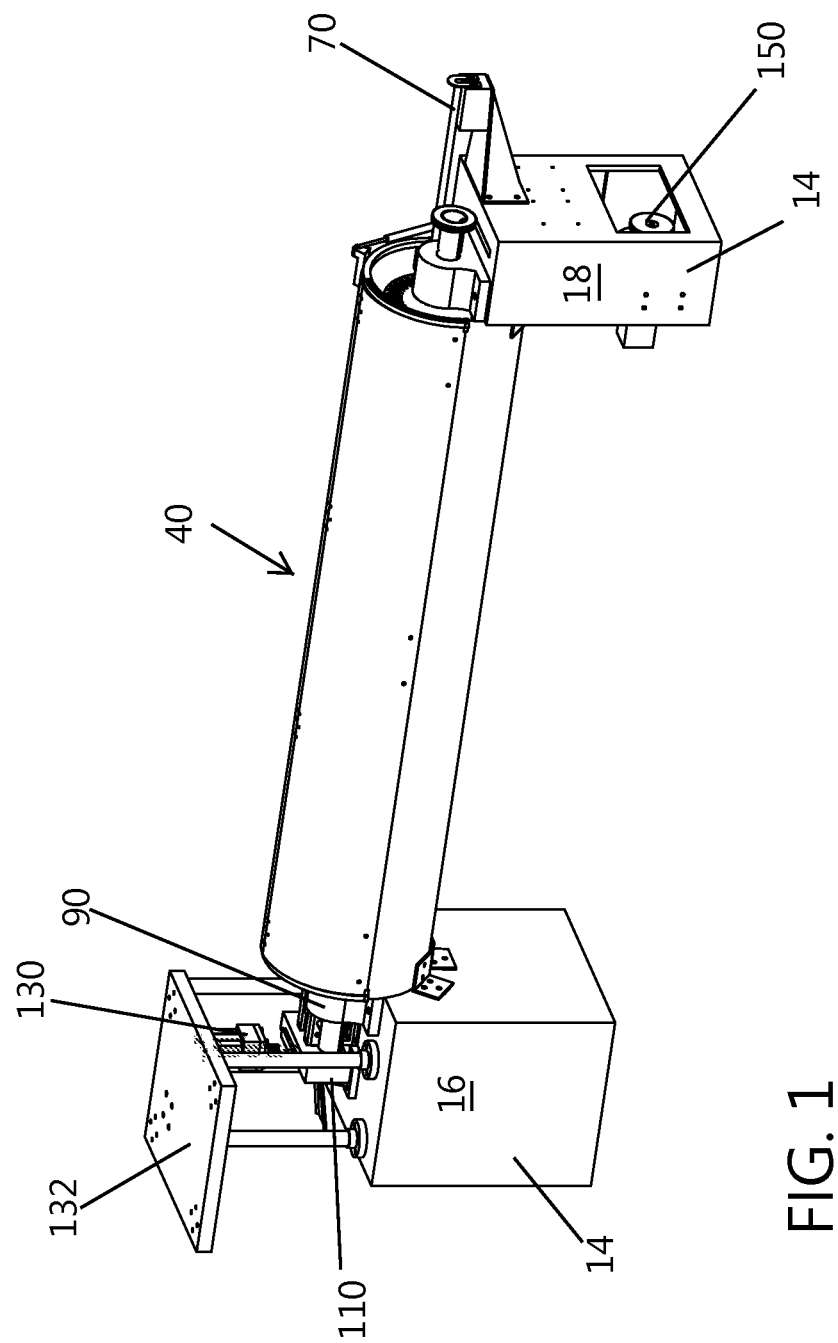
FIG. 1 is a front, upper right, perspective view of an embodiment of the automated DIN rail shear system of the present invention.
Figure 2:
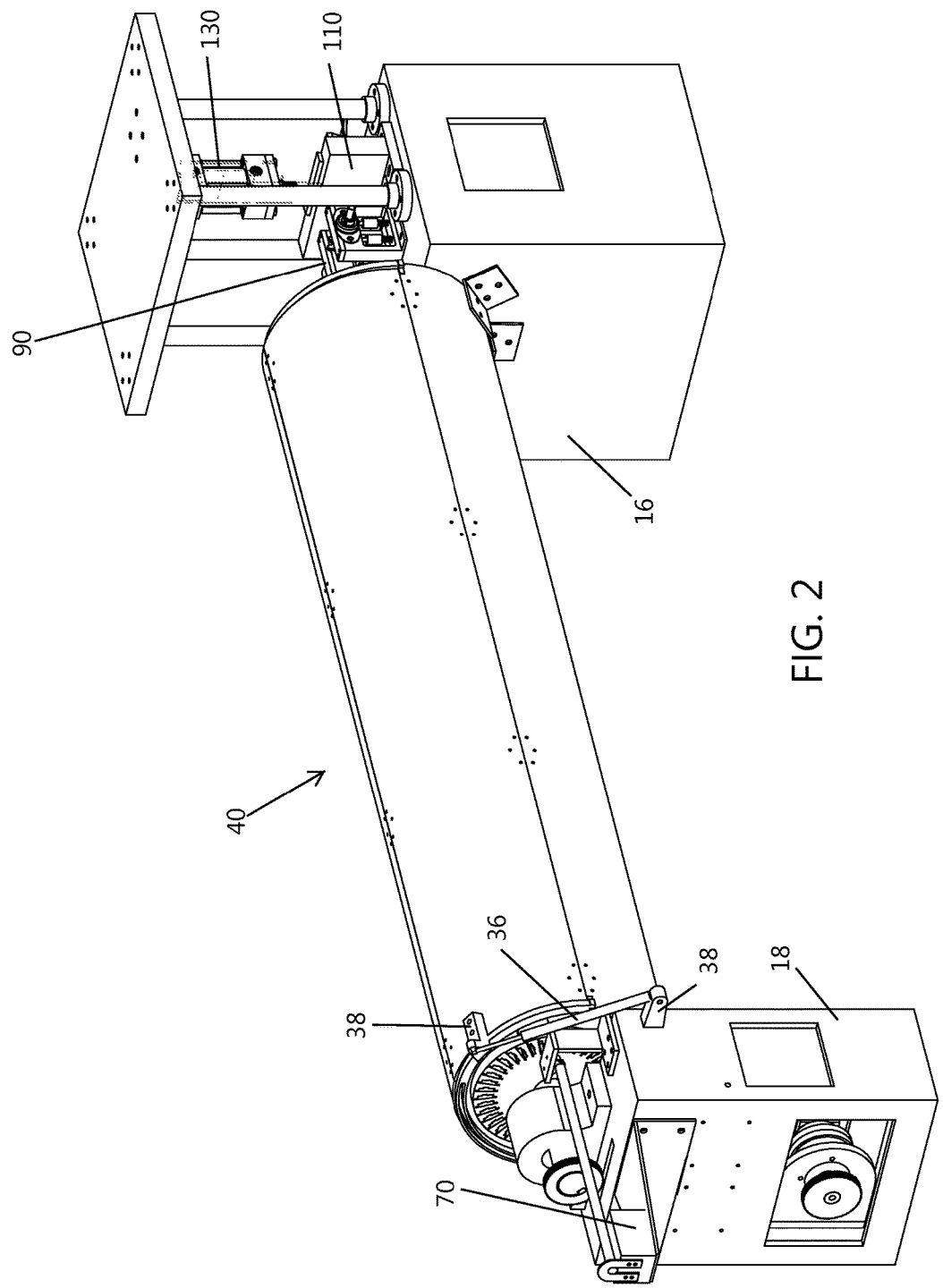
FIG. 2 is a back, upper right, perspective view of an embodiment of the automated DIN rail shear system of the type shown in FIG. 1.
Figure 3:
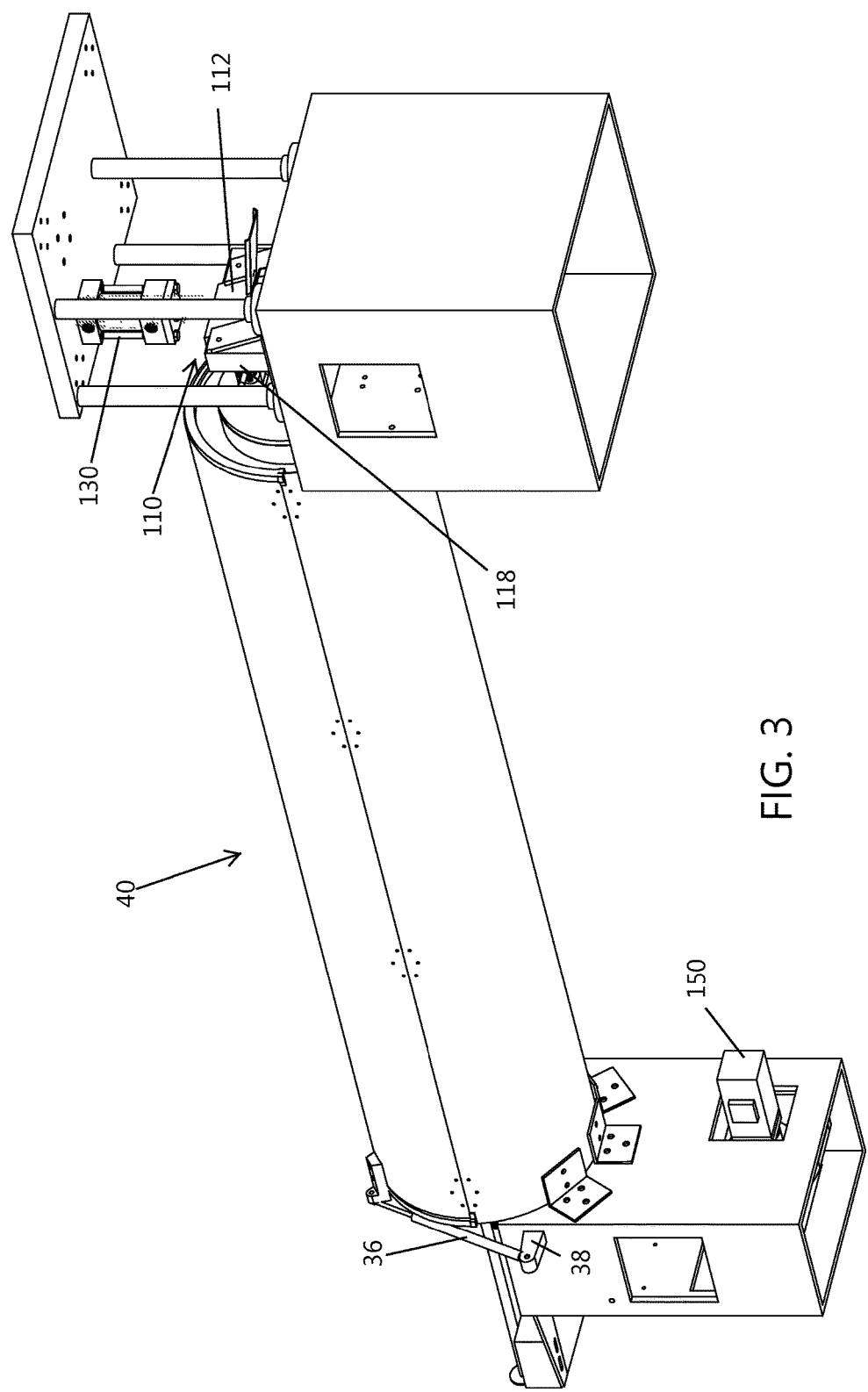
FIG. 3 is a back, lower left, perspective view of an embodiment of a the automated DIN rail shear system of the type shown in FIG. 1.

Referring first to FIGS. 1-3, the automated DIN rail shear system 10 of the present invention generally includes base 16 and 18 that together form frame 14, a storage cassette 40, a shear die assembly 110, a shear actuator 130, motors 150, a DIN rail advancer 70, and a DIN rail feed assembly 90. Motor 150 is servo driven and is coupled to the cassette 40 to rotate and index the cassette 40. The DIN rail advancer 70 may be of an air cylinder or hydraulic type and is positioned to advance DIN rail from the cassette 40 towards the die plate of the shear die assembly 110. The DIN rail feed assembly 90 may include a roller cog that feeds the DIN rail through the die plate in controlled and metered amounts.

Figure 4:
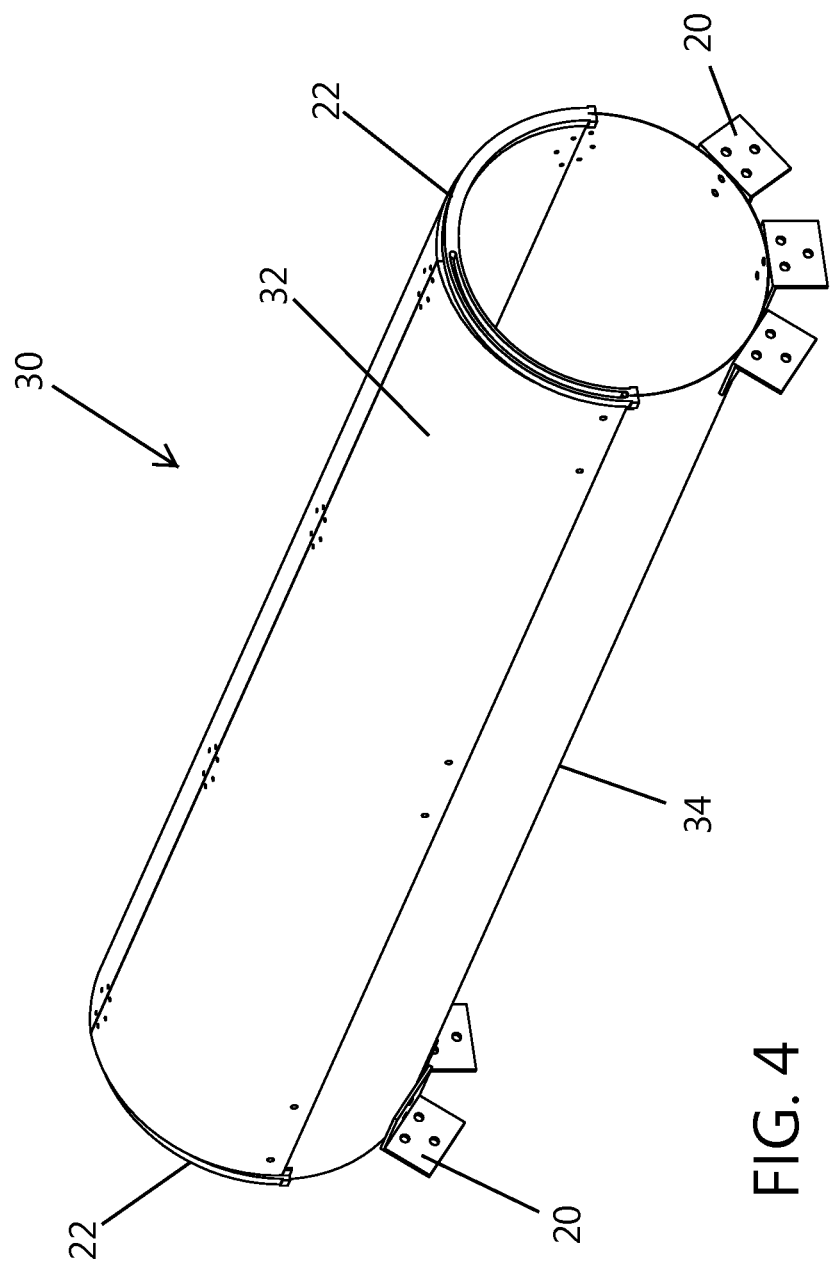
FIG. 4 is a front upper right, perspective view of the cassette enclosure of the present invention.
Figure 5:
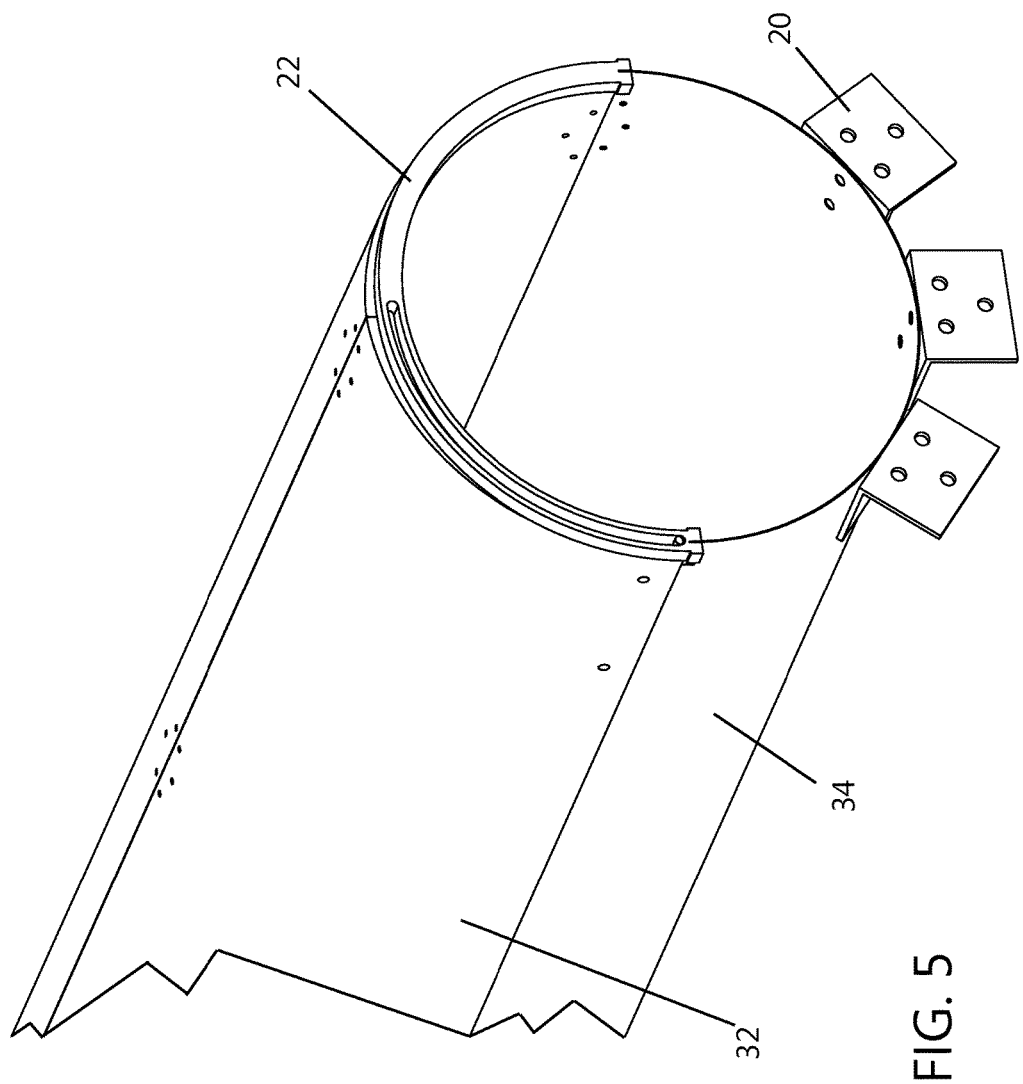
FIG. 5 is a partial sectional, right end, perspective view of the enclosure of the type shown in FIG. 4.
Figure 6:
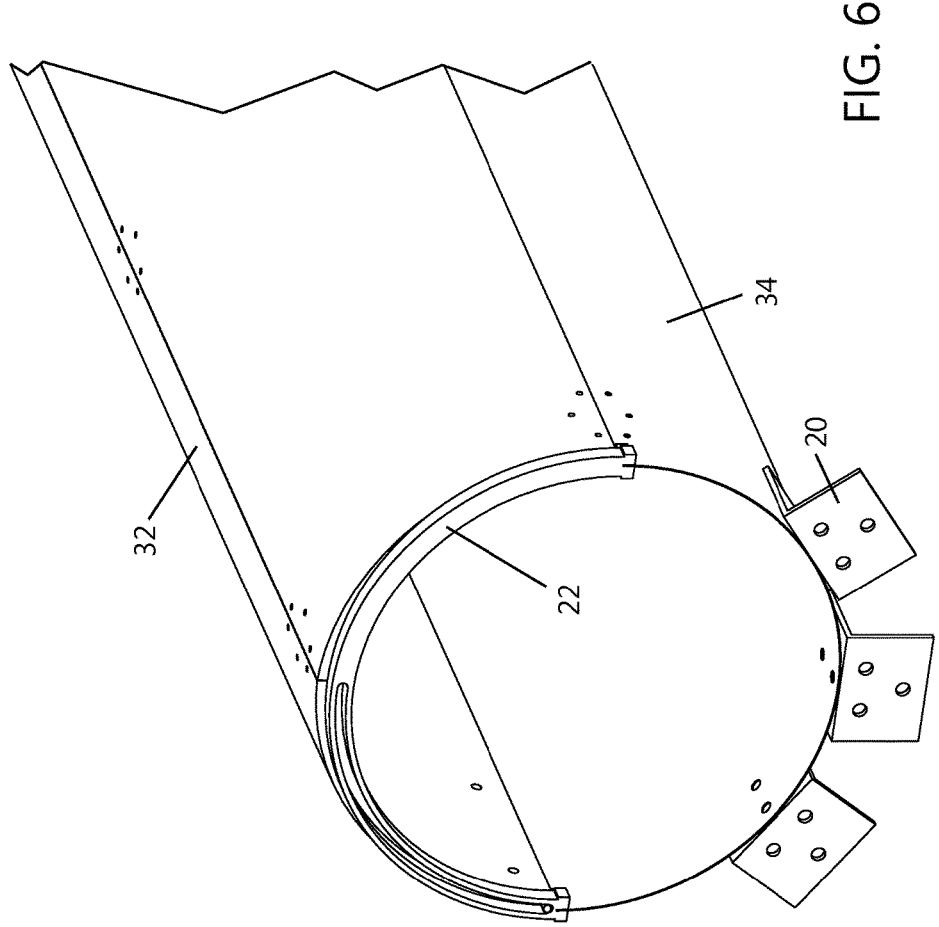
FIG. 6 is a partial sectional, left end, perspective view of the enclosure of the type shown in FIG. 4.

FIGS. 4-6 illustrates the enclosure 30 that surrounds cassette 40 in greater detail. The enclosure 30 includes mounting brackets 20 that mount the enclosure 30 between base 16 and 18 of frame 14. The enclosure 30 includes a bottom portion 34 and cover portion 32. Slots, tracks, or guides 22 are arranged on ends of the bottom to allow the cover 32 to rotate about a central shaft 52 of the cassette 40 and to slide within the guides 22 between an open and closed position. An air spring or hydraulic actuator 36 is mounted to the base 16 and cover 32 with mounting brackets 38. Actuation of the air spring 36 is dependent upon electrical signals controlled by the controller.

Figure 7:
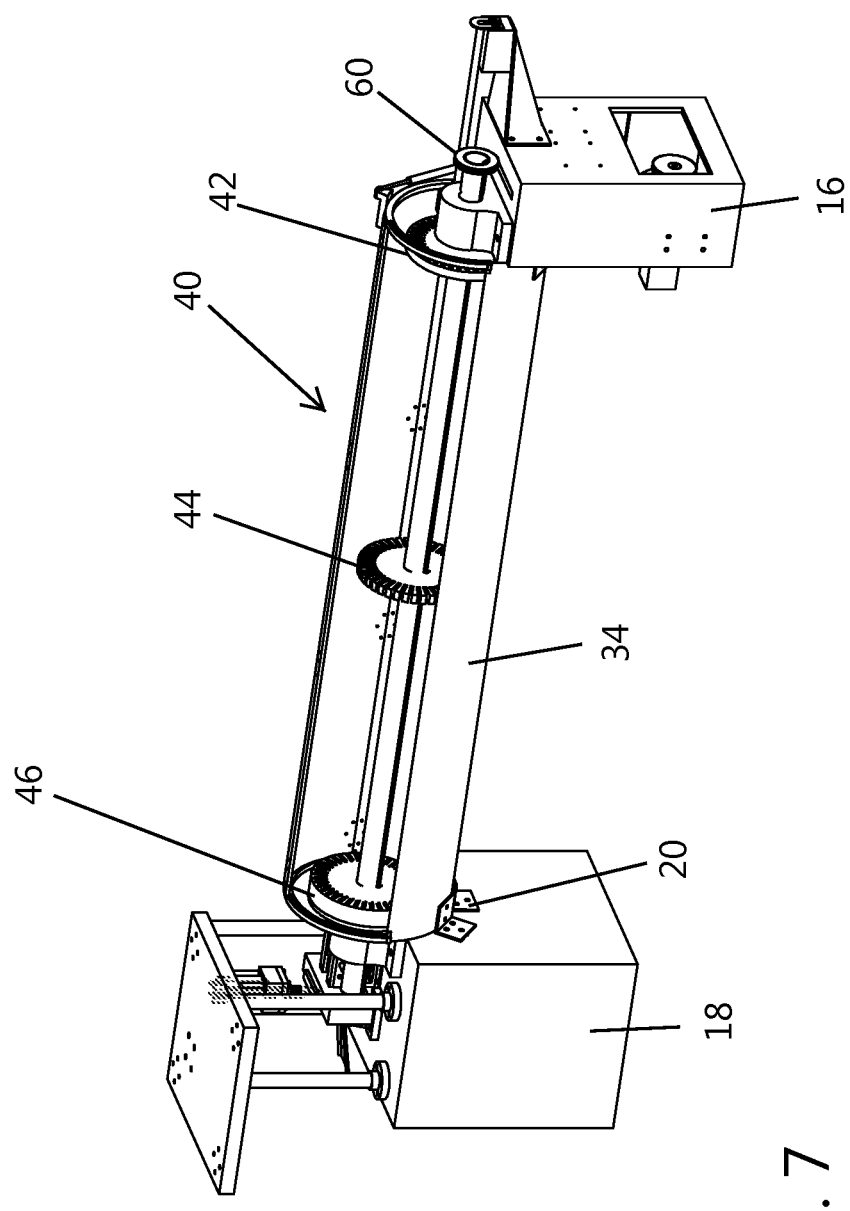
FIG. 7 is a front, upper right, perspective view of an embodiment of the automated DIN rail shear system of the present invention with the cassette cover slid open.
Figure 8:
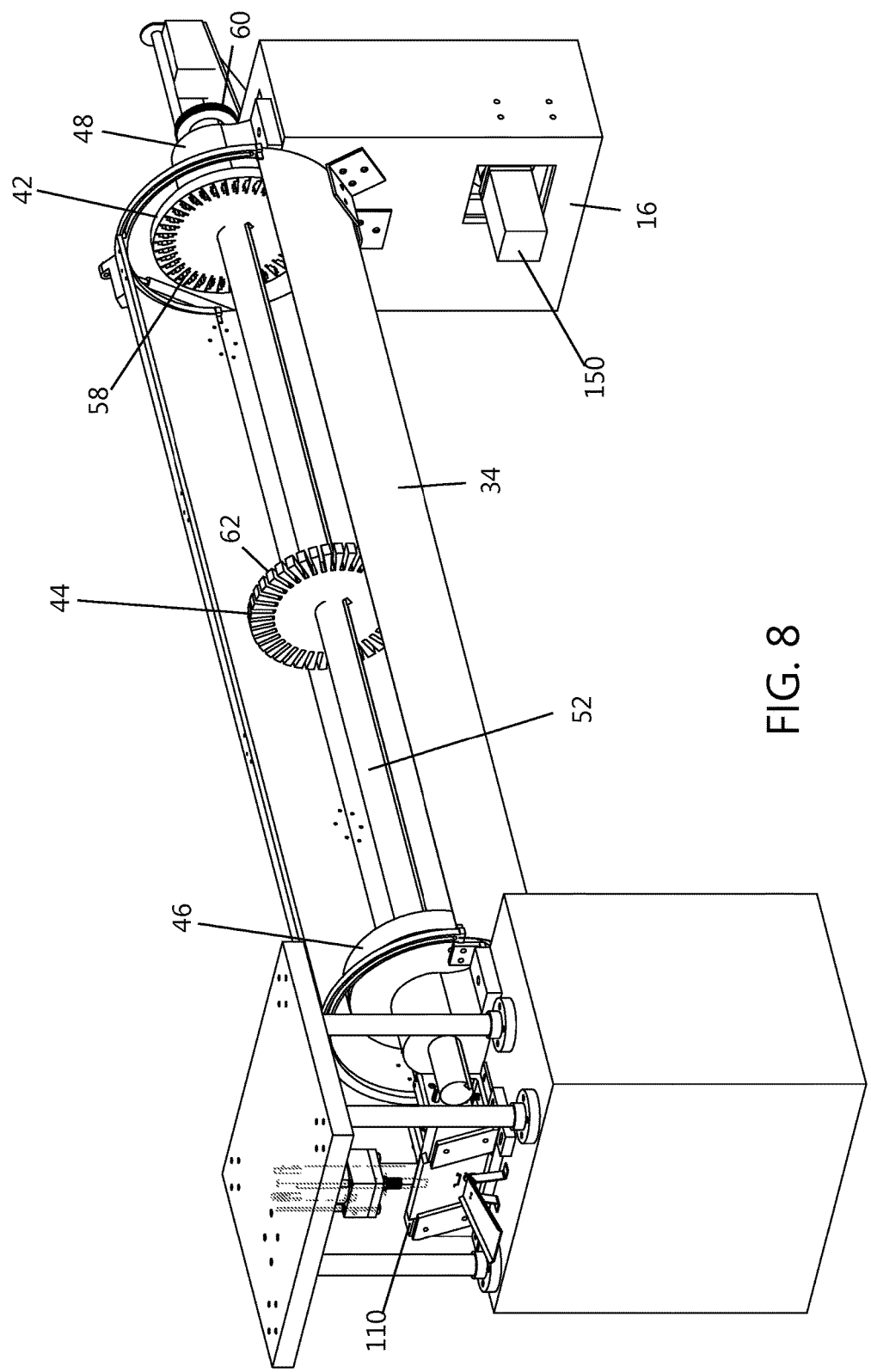
FIG. 8 is a front, upper left, perspective view of an embodiment of the automated DIN rail shear system of the type shown in FIG. 7.
Figure 9:
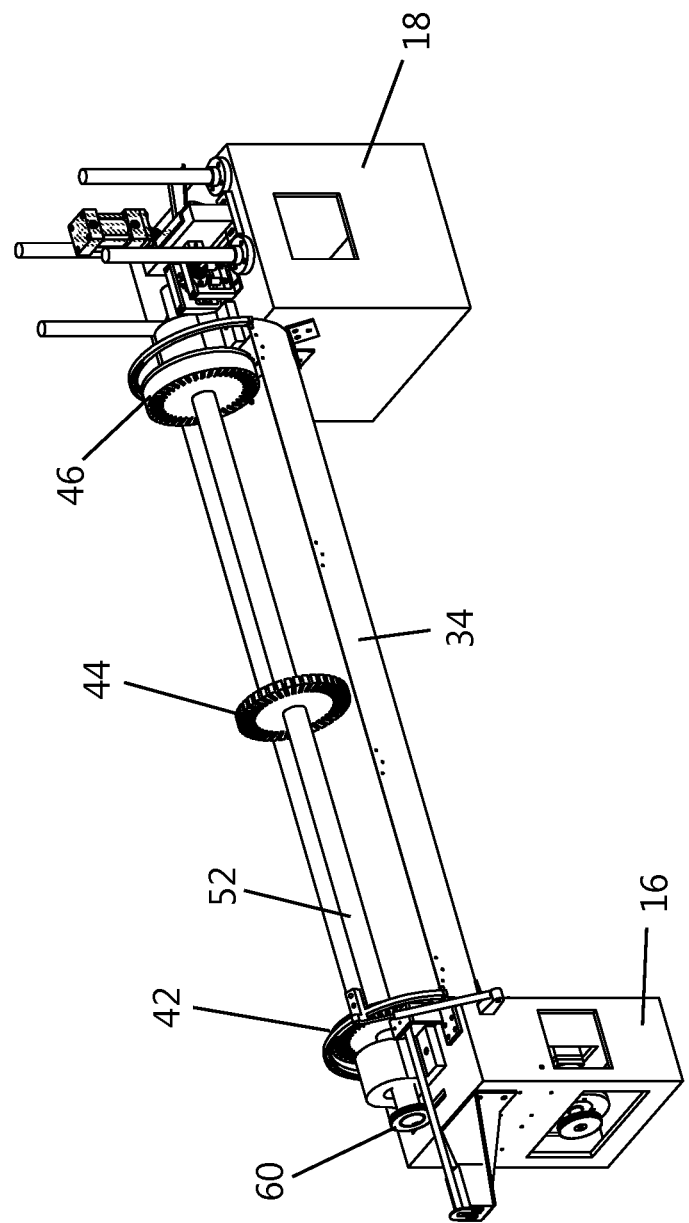
FIG. 9 is a back, upper right, perspective view of an embodiment of the automated DIN rail shear system of the present invention with portions of the enclosure and shear actuator assembly removed.

FIGS. 7-9 illustrates the cassette 40 coupled to base 16 and base 18. The cassette 40 generally includes spaced apart revolver gears 42, 44, and 46 that are coupled to a keyed shaft 52. The shaft is supported and coupled to the base 16 and 18 with pillow blocks 48 and 50. Bearings within the pillow blocks 48 and 50 provide for a smooth rotation of the shaft. End stops may be fixed to the shaft to retain the gears 42, 44, and 46 in a fixed longitudinal position along the shaft. Pulley 60 is fixed to an end of the shaft 52 and aligned with motor 150. Gears 44 and 48 includes slots that are shaped to conform to the shape of a cross section of the DIN rail blanks. The slots 58 secure the DIN rail to the gear and orient the rail relative to the die slot 120 in the die plate 118 of the shear die assembly 110. Mid gear 44 includes an open slot 62 that acts as a guide as the rail is advanced towards the shear assembly 110.

Figure 10:
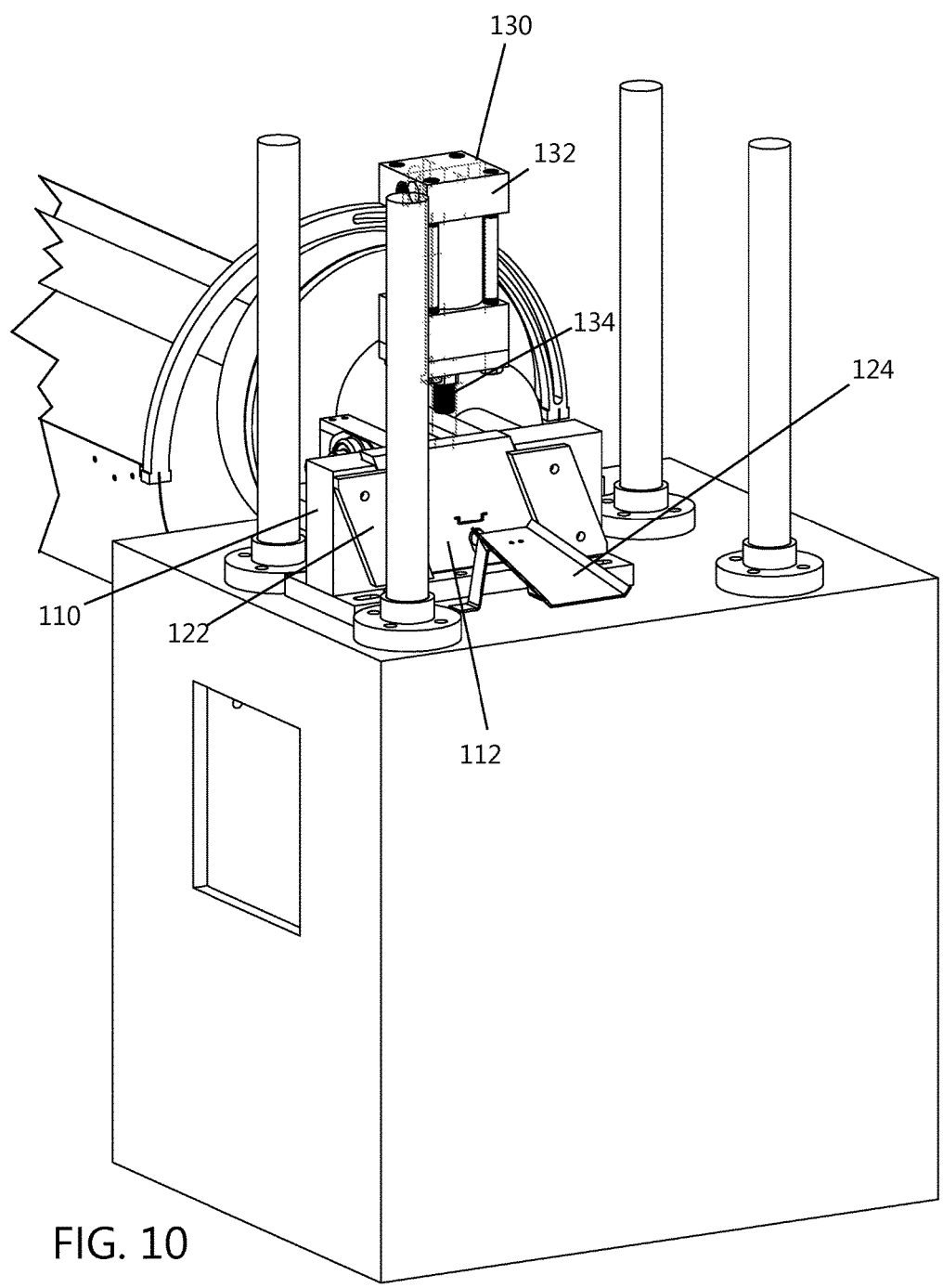
FIG. 10 is a partial sectional end perspective view of the shear system of the automated DIN rail shear system of the present invention.
Figure 11:
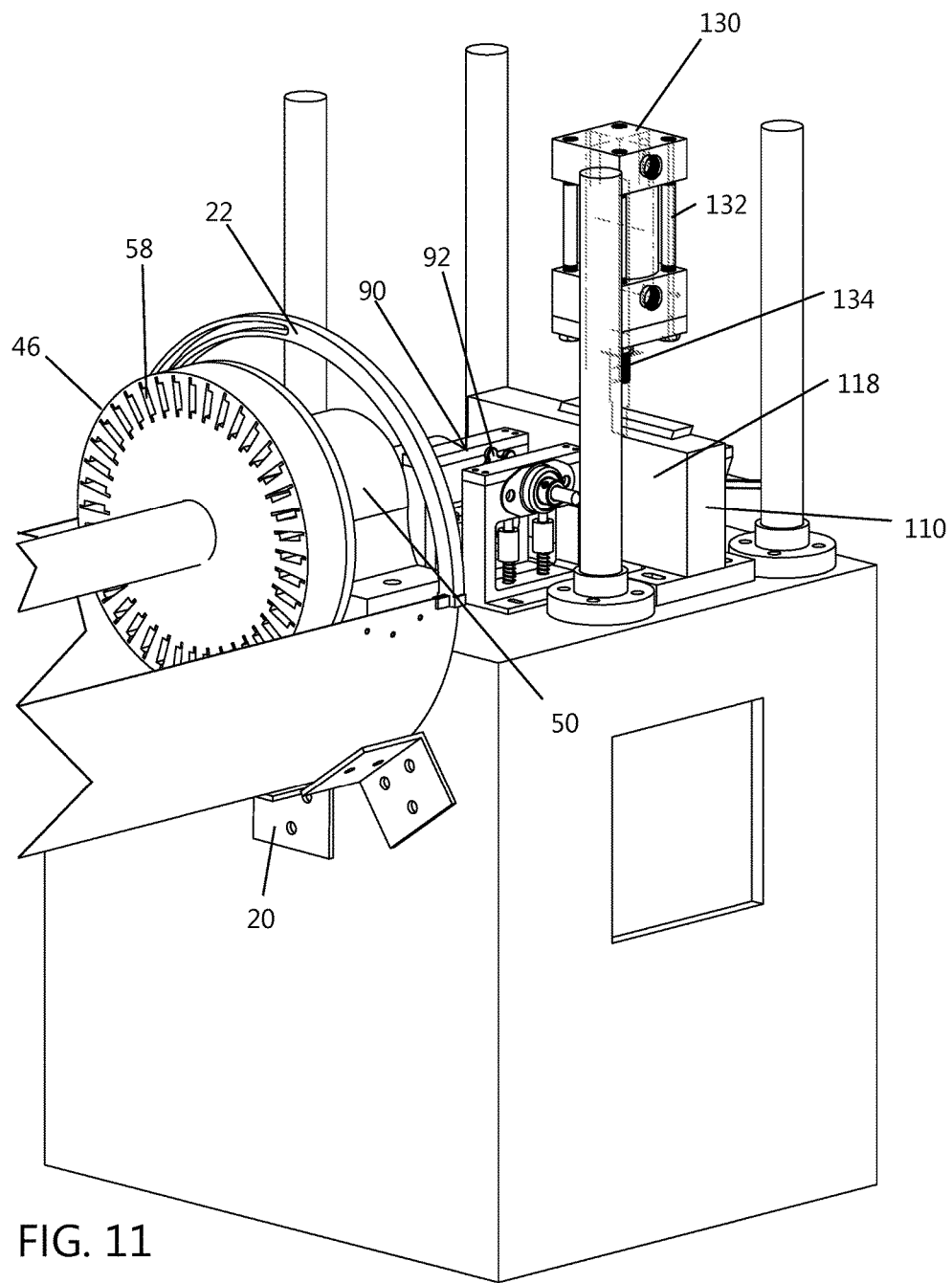
FIG. 11 is a partial sectional back end perspective view of the shear system of the type shown in FIG. 10.

FIGS. 10-11 further illustrates the orientation and alignment of a portion of the cassette 40, cog assembly 90, and shear assembly 110. Although only gear 46 is illustrated in FIGS. 10 and 11, all gears 42, 44, and 46 of cassette 40 align and orient with the cog roller 92 and slot 120 of the shear system 110. Rail advancer 70 pushes a DIN rail blank through the gear's slots to the cog assembly. The cog roller 92 of the cog assembly is indexed and rotated in controlled amounts to advance the rail through the shear system 110 by known distances. Additionally, proximity switches and sensors may be utilized to determine the amount the DIN rail blank is advanced. Shear actuator 130 is elevated above and fixed to frame 132. A piston 134 of the shear actuator aligns with the punch or shear plate 112 of the shear assembly. The piston is actuated downward against the shear plate. The shear plate moves downward, shearing a DIN blank extending through the die plate 118 and shear plate 112. The sheared portion of the DIN rail blank slides down the chute or funnel assembly 124.

Figure 12:
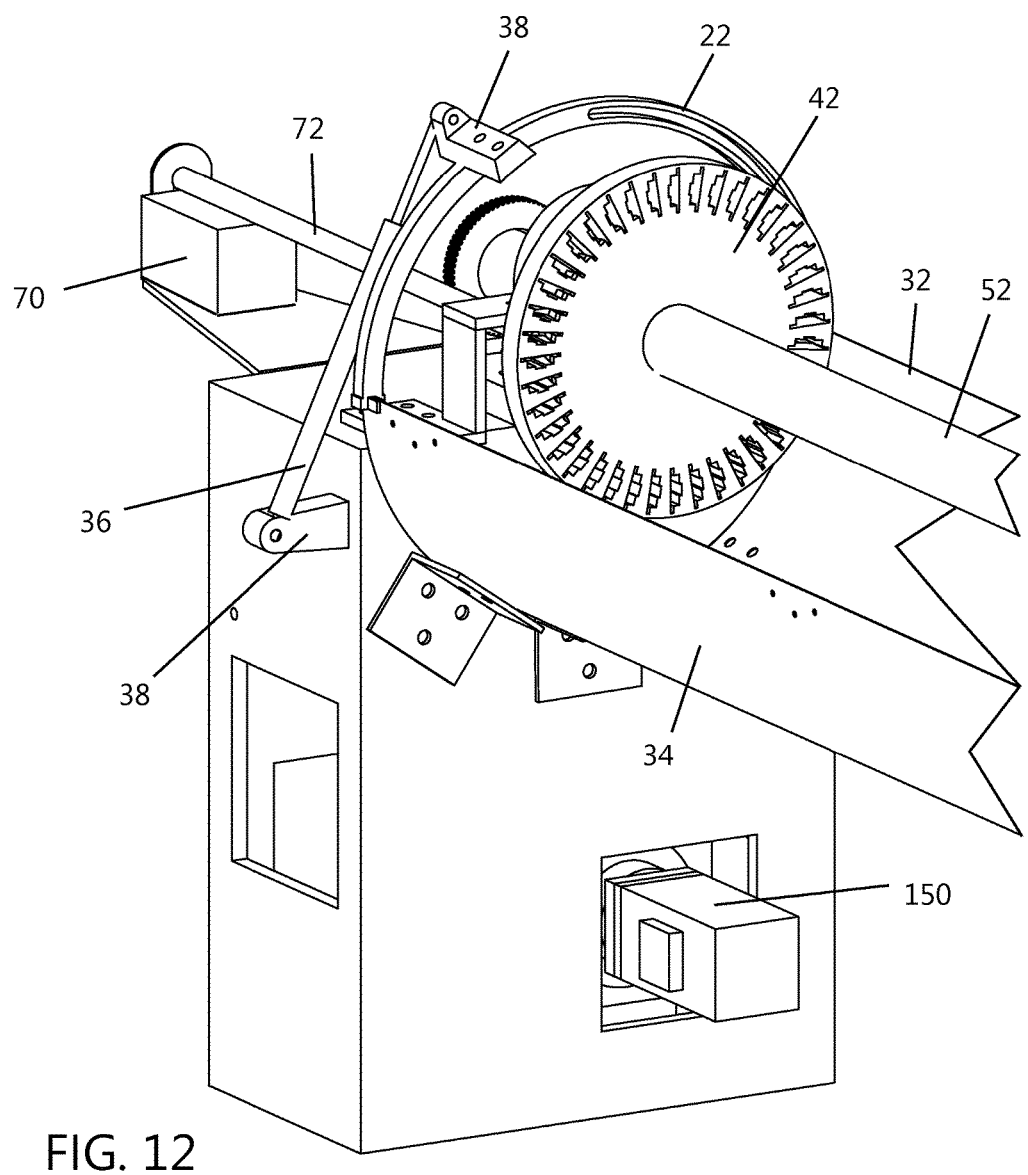
FIG. 12 is a partial sectional back, perspective view of a portion of the cassette and DIN rail advancer of the automated DIN rail shear system of the present invention.
Figure 13:
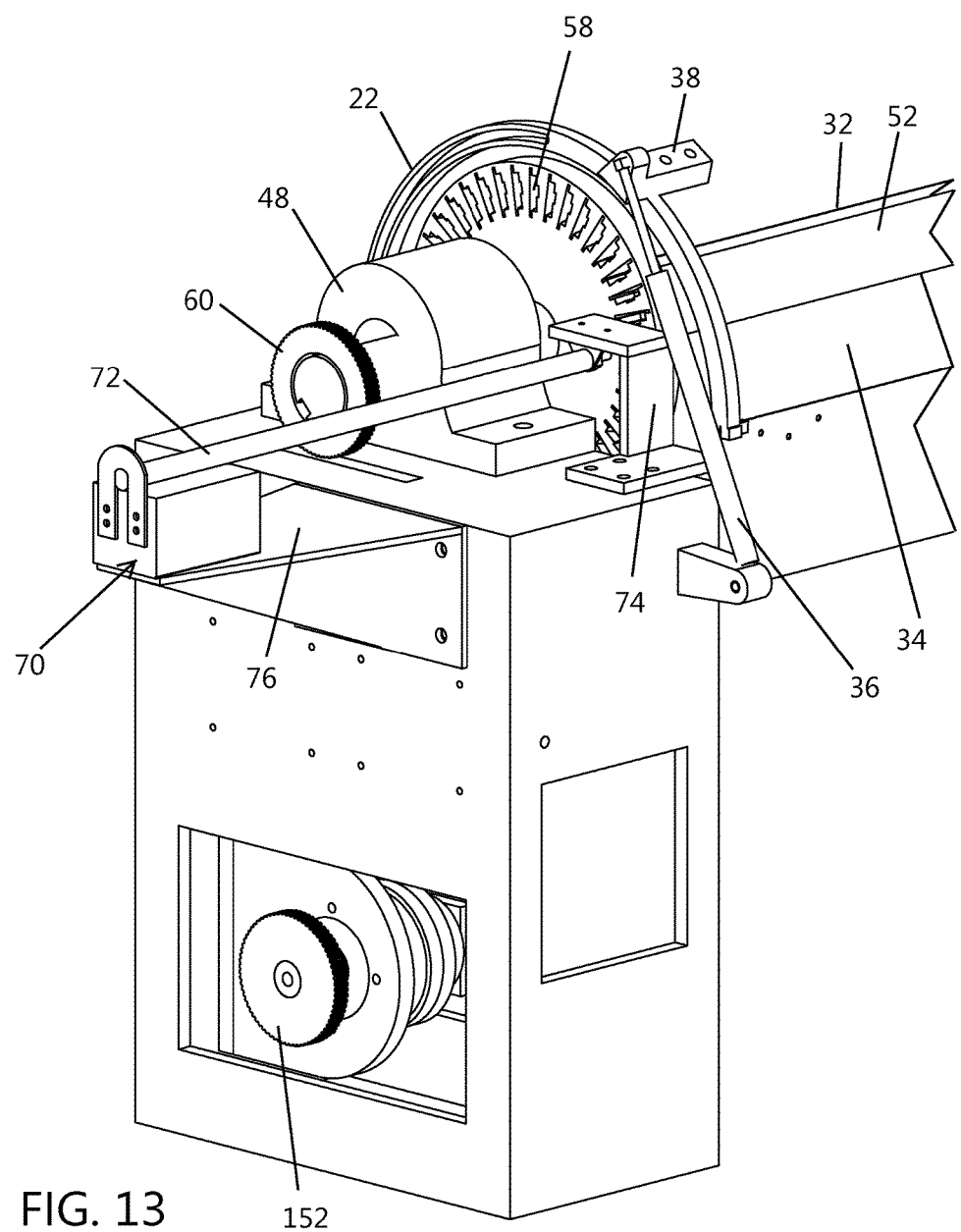
FIG. 13 is a partial sectional end perspective view of a portion of the cassette and DIN rail advancer of the automated DIN rail shear system of the present invention.

FIGS. 12-13 further illustrates the rail advancer 70 and base 16 engaged with a motor end of the cassette. Servo motor 150 is fixed to base 16 and includes a motor pulley 152 aligned with cassette pulley 60. A chain or belt couples the pulleys so that rotation of the servo controlled motor 150 rotates the cassette by defined and known increments. Linear actuator or DIN rail advancer 70 is fixed to the base 16 with gusset 74 and bracket 76. A control signal from the controller activates the linear actuator or air cylinder 72 to advance an aligned DIN rail through the cassette 40 by known increments.

Figure 14:
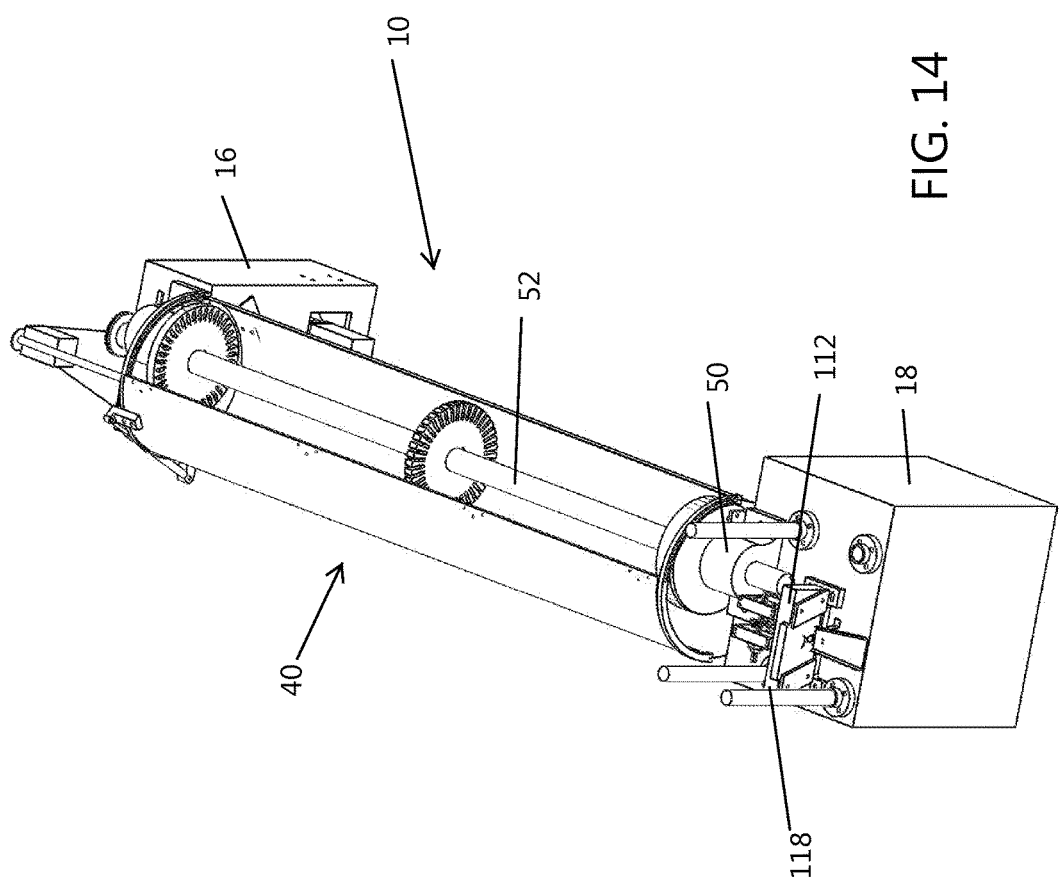
FIG. 14 is a partial sectional top left end perspective view of an embodiment of the automated DIN rail shear system of the present invention with the cassette cover slid open.
Figure 15:
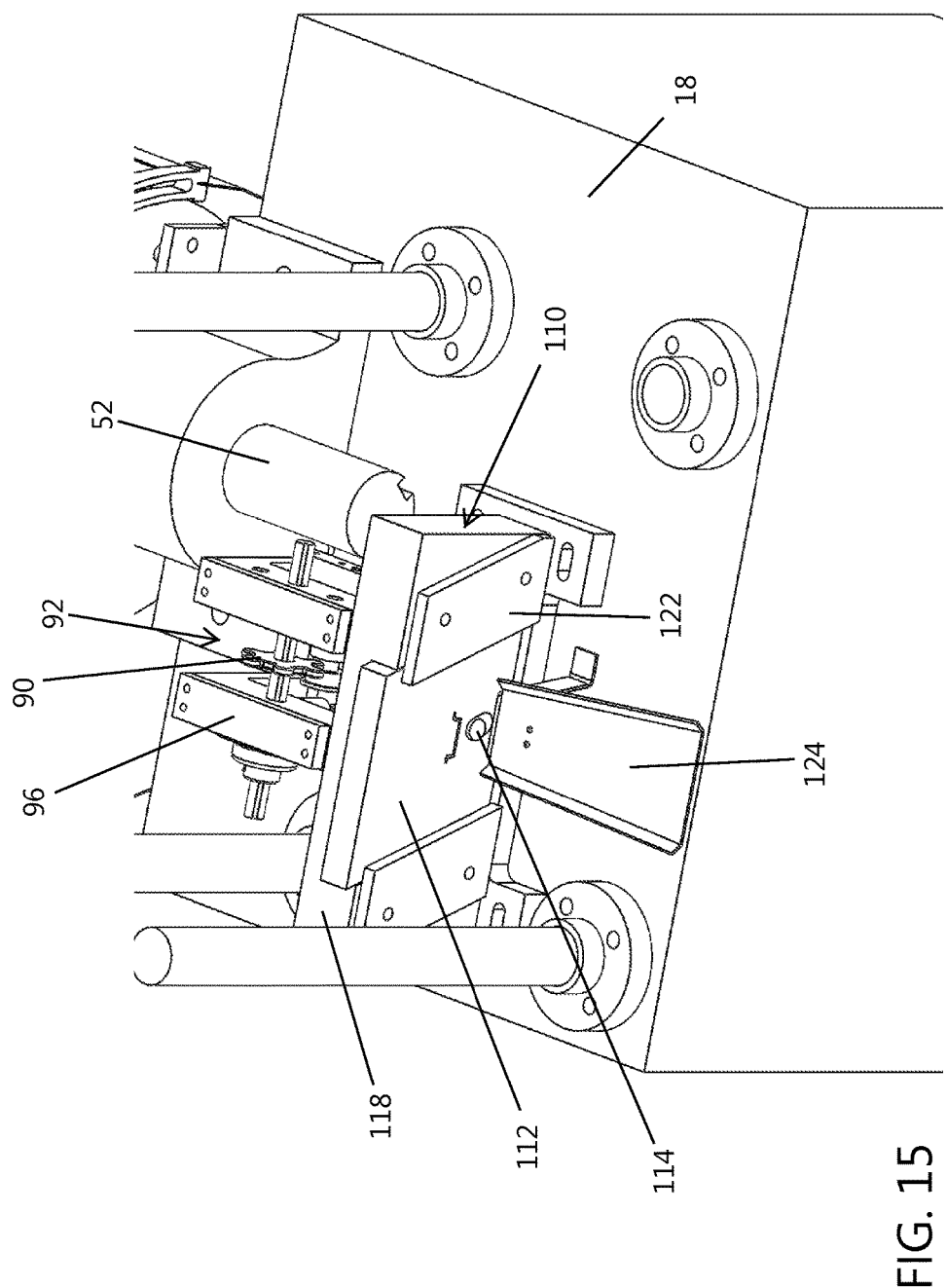
FIG. 15 is a partial sectional top end perspective view of the shear assembly and cog assembly of the automated DIN rail shear system of the present invention.
Figure 16:
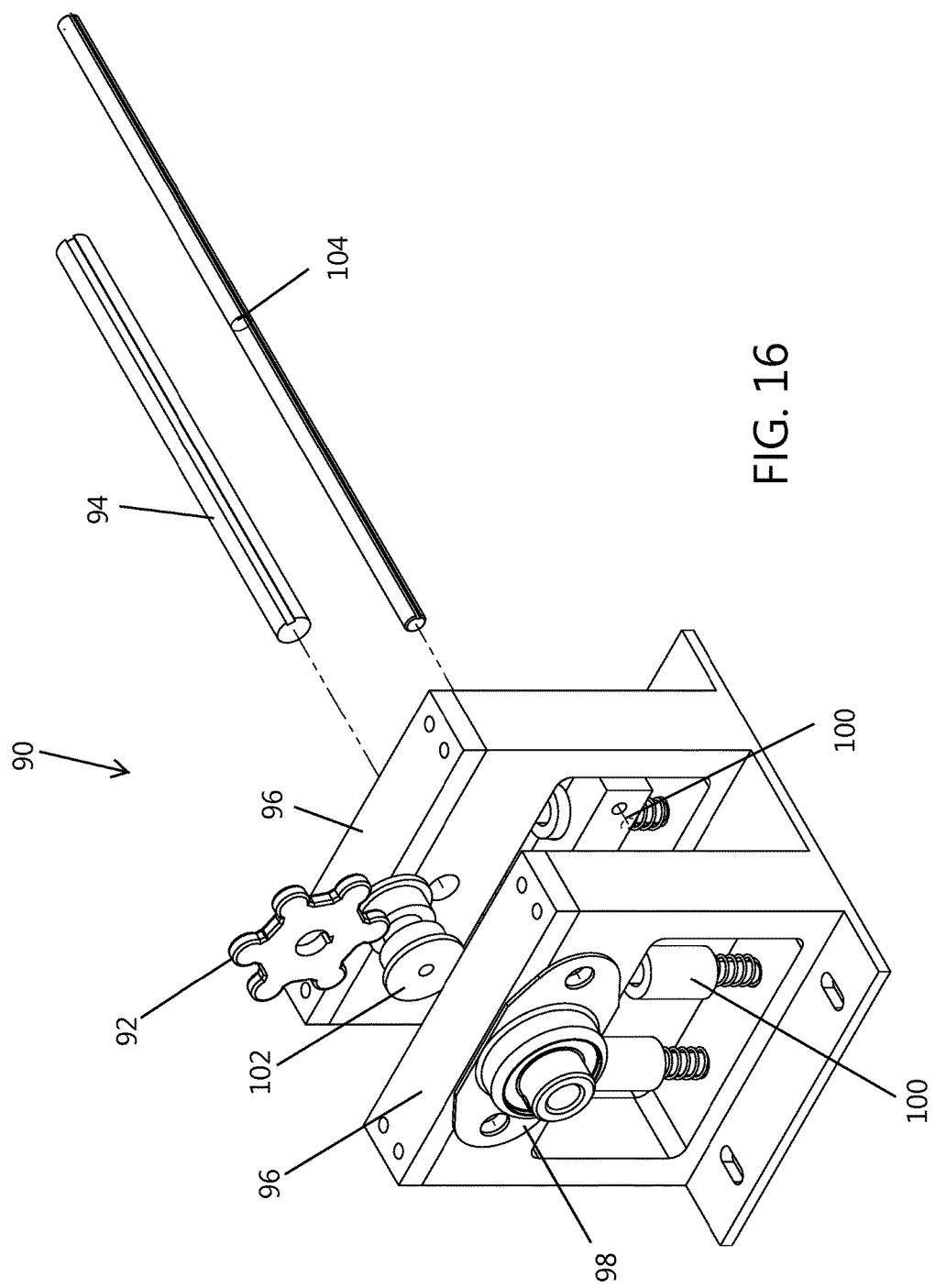
FIG. 16 is a partial exploded left perspective view of the cog assembly of the automated DIN rail shear system of the present invention.
Figure 17:
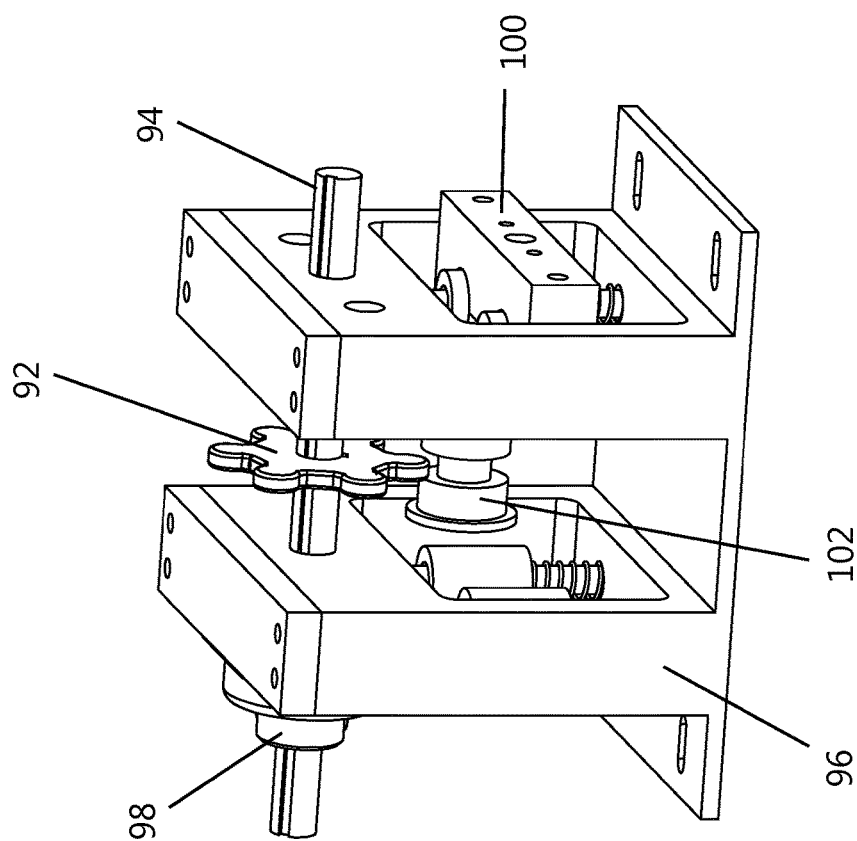
FIG. 17 is a perspective view of a portion of the cog assembly of the automated DIN rail shear system of the present invention.
Figure 18:
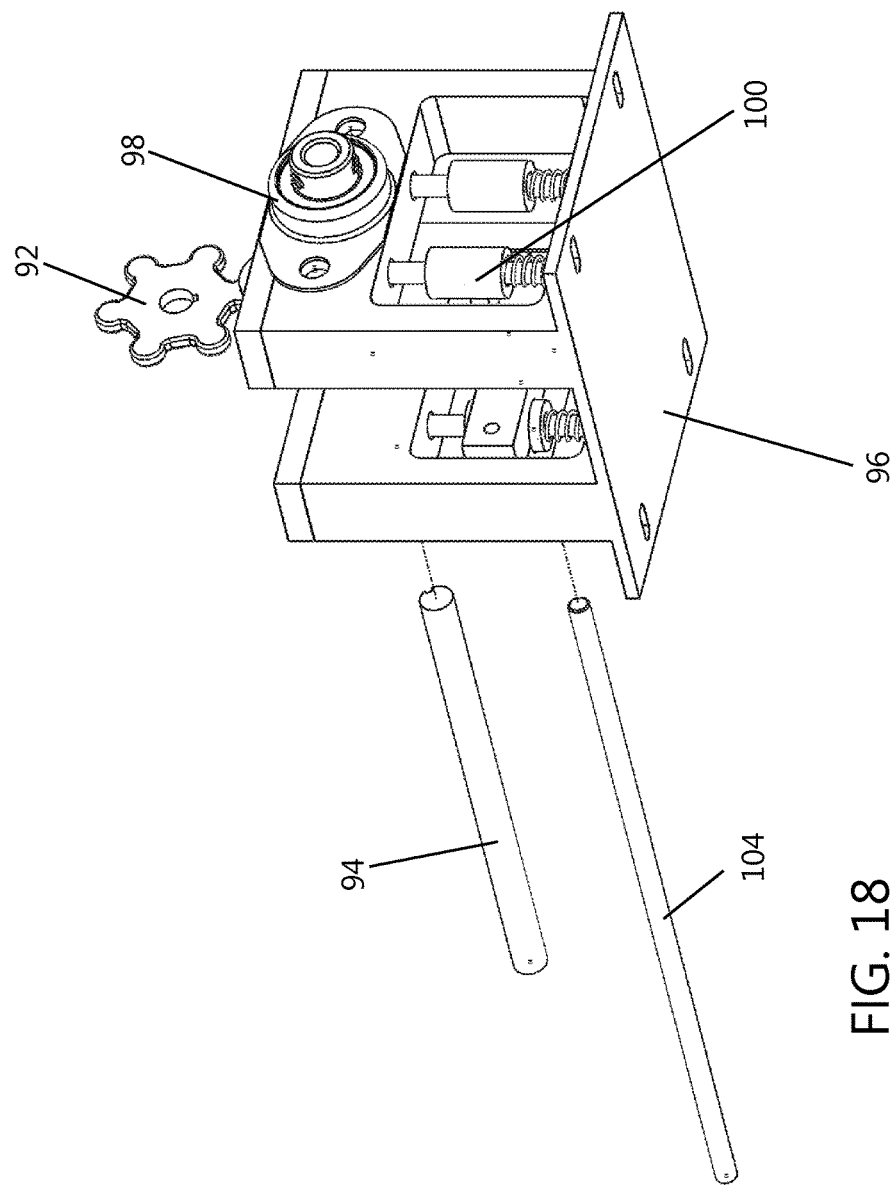
FIG. 18 is a bottom left exploded perspective view of the cog assembly of the type shown in FIG. 16.
Figure 19:
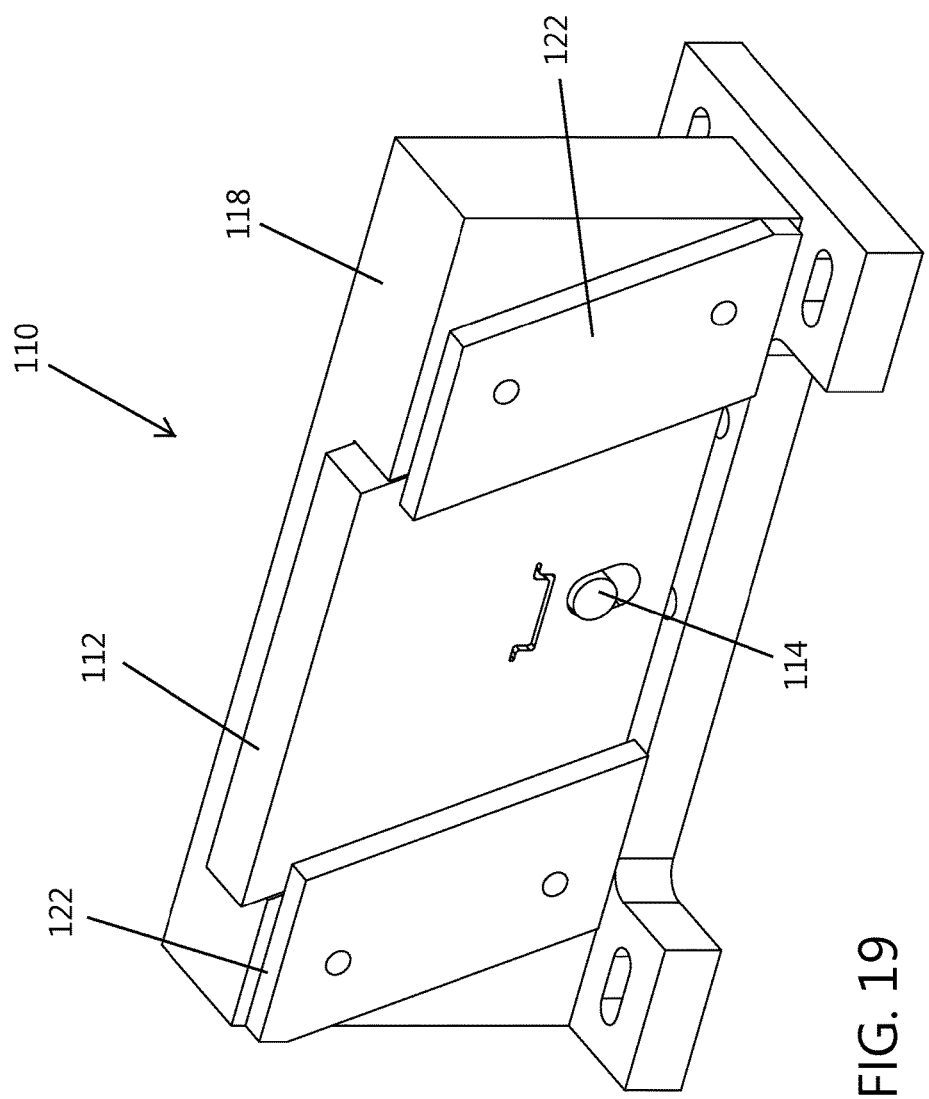
FIG. 19 is a front perspective view of a portion of the shear assembly of the automated DIN rail shear system of the present invention.
Figure 20:
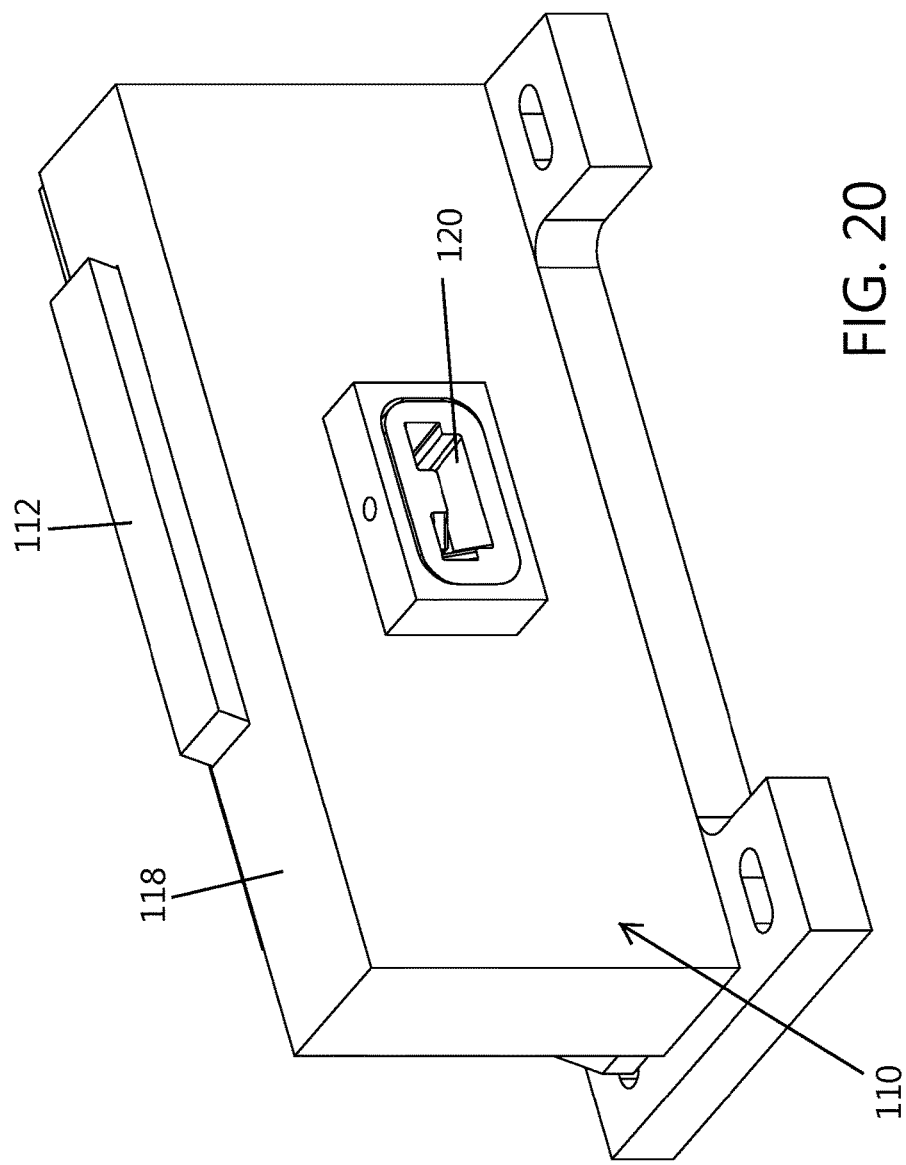
FIG. 20 is a back perspective view of a portion of the shear assembly of the automated DIN rail shear system of the present invention.

As the DIN rail blank advances from the cassette, the blank is fed through the cog assembly 90 and into die plate 118 of the shear assembly 110. FIGS. 14-15 illustrates the orientation of the shear system 110 in the automated DIN rail shear system 10. Shear plate 112 may be spring biased to return to an open position when not shearing a rail. The components of the cog assembly 90 is further illustrated in FIGS. 16-18. The cog assembly 90 includes a cog roller 92 that is fixed to a support frame 96. The cog roller is keyed to shaft 94 and rotates within bearings 98. Rail is supported by an idler wheel 102 that spins freely about shaft 104. Suspension 100 provides for a smooth advancement of the DIN rail blank through the cog assembly 90. Shear assembly 110 shown in FIGS. 19-20 includes punch plate 112 and die plate 118. Die plate 118 is mounted and held in place to base 18 and shear plate 112 slides between a shearing and open position. Guide 114 keeps the shear plate 112 in alignment as it moves between the open and shearing positions. The die plate 118 base is attached to base 18 with screws that extend through the bottom of the base 18 and into threaded holes in the plate 118. Shear guard 122 attaches to die plate or shear frame 118 and further keeps shear plate 112 in alignment as the shear plate moves between the open and shearing position.

Figure 21:
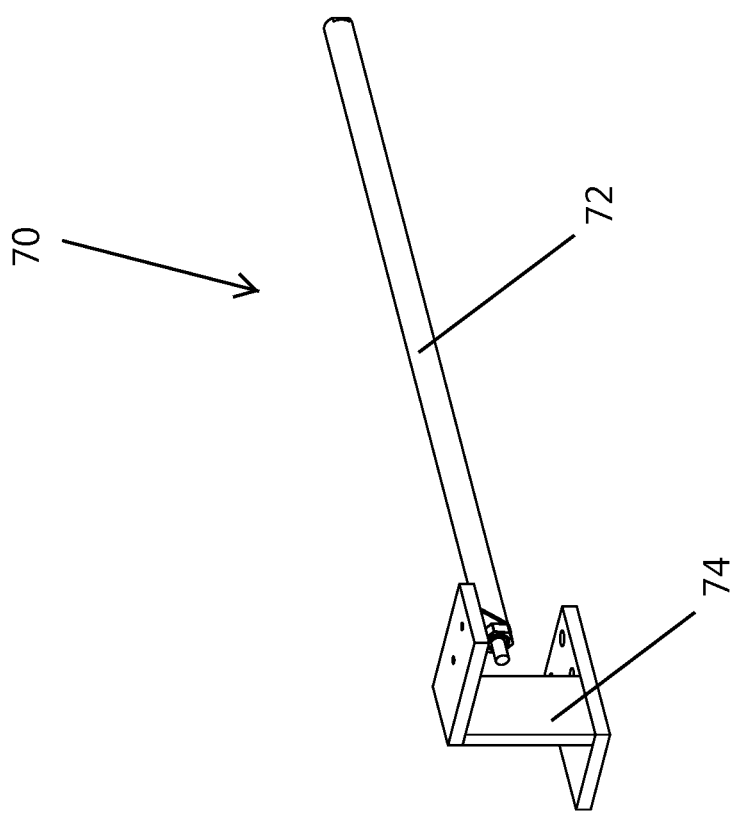
FIG. 21 is an upper back perspective view of a portion of an embodiment of the DIN rail advancer of the automated DIN rail shear system of the present invention.
Figure 22:
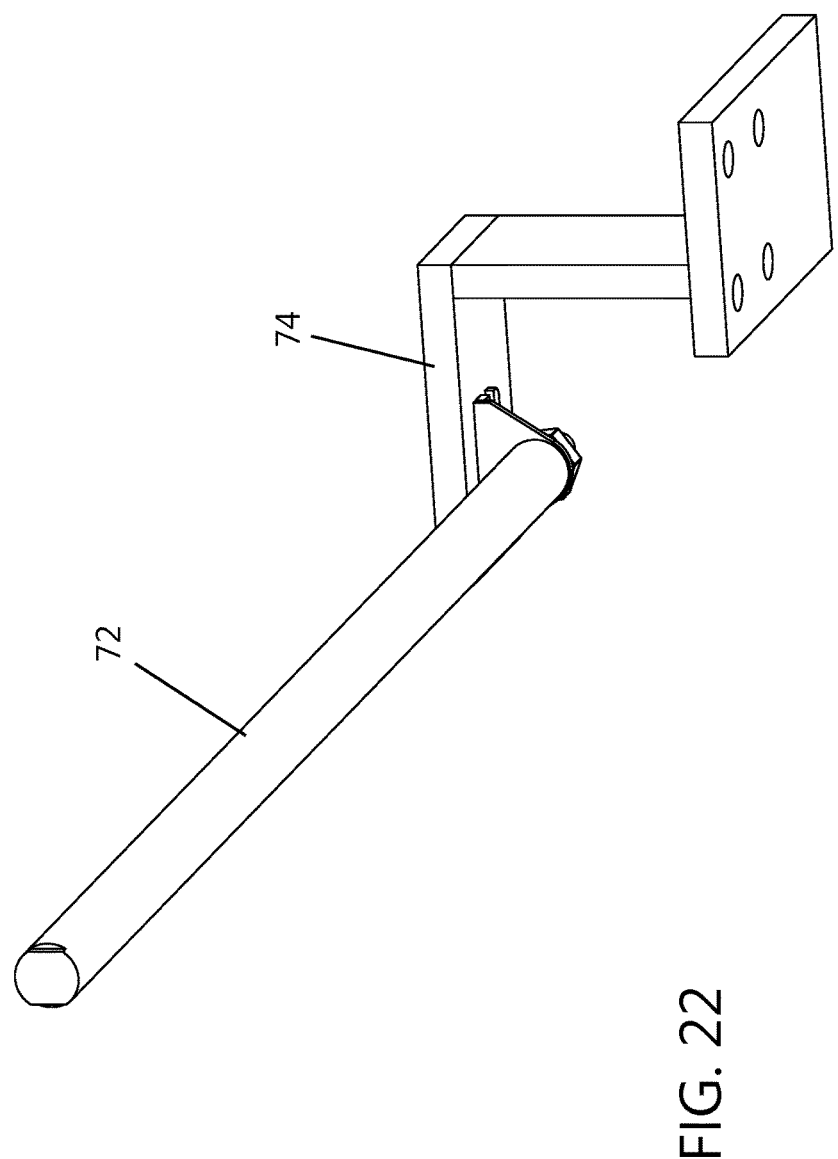
FIG. 22 is a lower front perspective view of a portion of an embodiment of the DIN rail advancer of the automated DIN rail shear system of the present invention.
Figure 23:
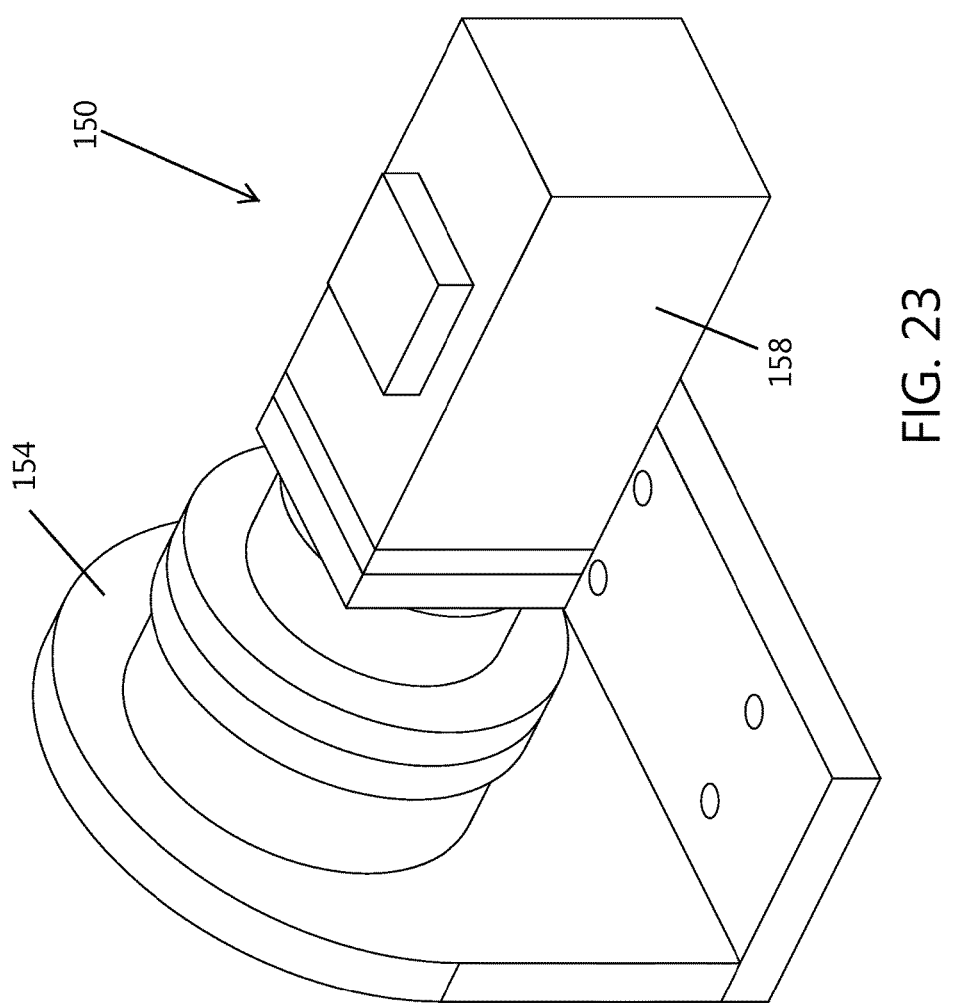
FIG. 23 is a front perspective view of a portion of an embodiment of the cassette drive of the automated DIN rail shear system of the present invention.
Figure 24:
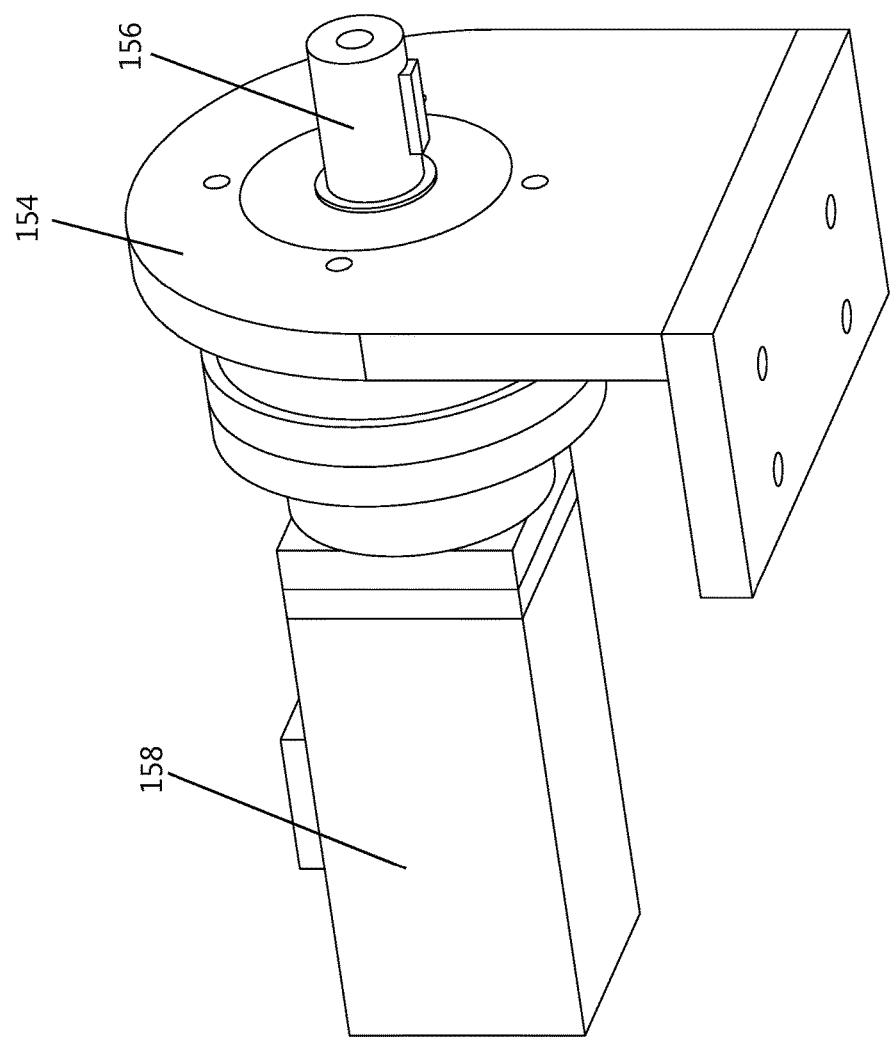
FIG. 24 is a back perspective view of a portion of an embodiment of the cassette drive of the automated DIN rail shear system of the present invention.
Figure 25:
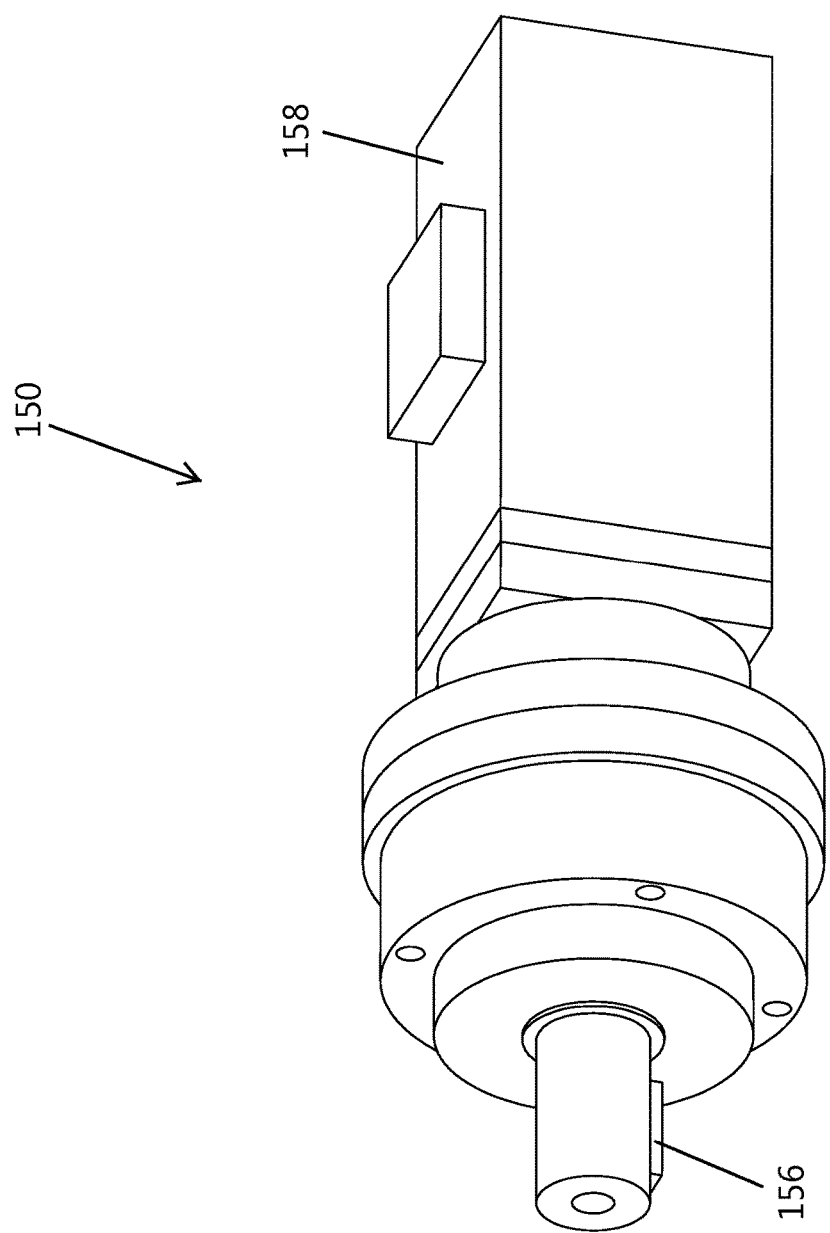
FIG. 25 is a front perspective view of a portion of an embodiment of the motor assembly of the automated DIN rail shear system of the present invention.

As described above and as illustrated in FIGS. 21-22 the DIN rail advancer 70 may be comprised of an air cylinder 72. The air cylinder 70 is mounted to base 16 via a gusset block and plate 74 and bracket 76. The air cylinder 70 mounts flush with the bracket 76. Keyed servo controlled motor 150 is illustrated in FIGS. 23-25. Motor 150 includes mounting bracket 154, keyed shaft 156, and control box 158. The keyed shaft 156 couples to motor pulley 152.

Figure 26:
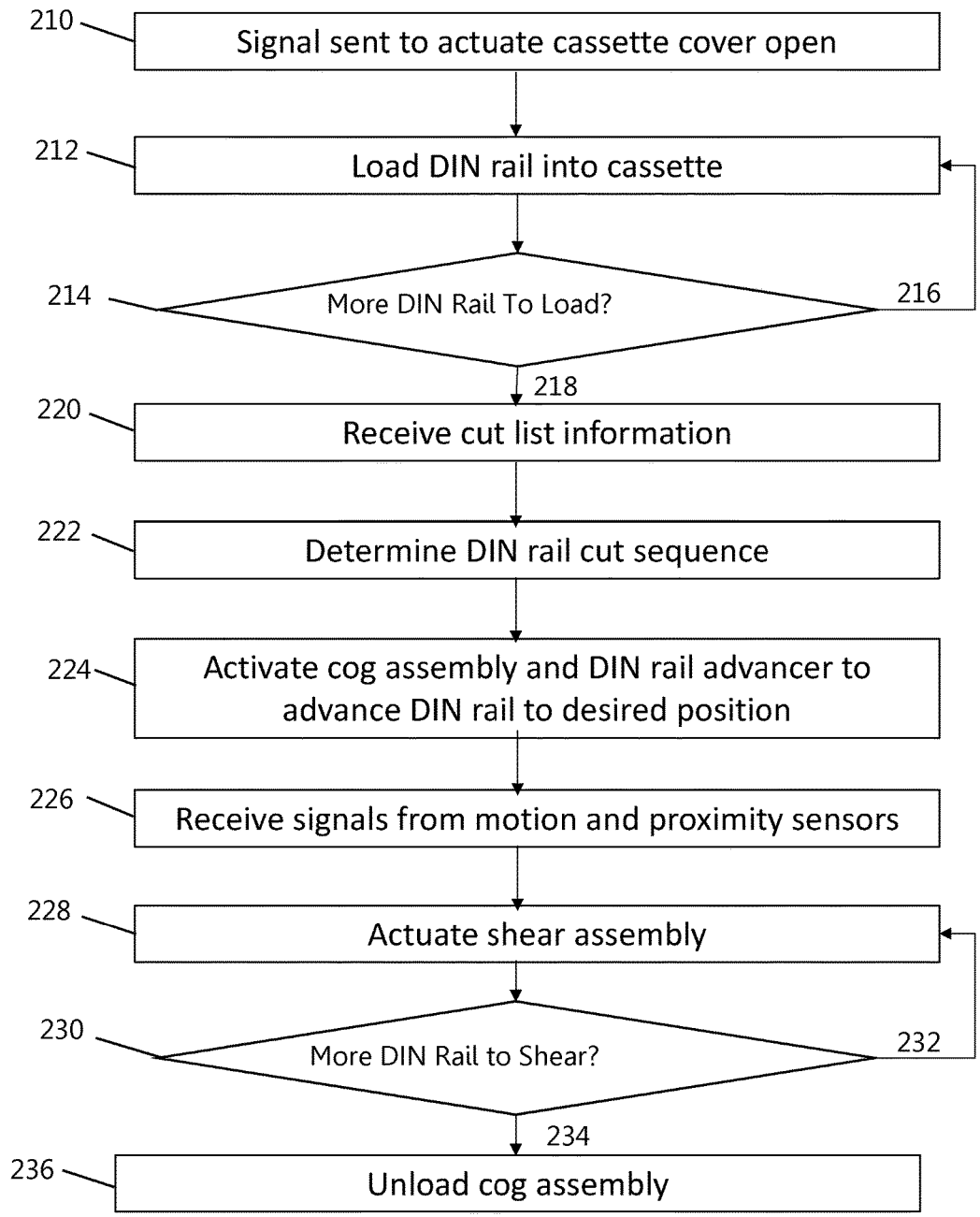
FIG. 26 is a flowchart illustrating use of the DIN rail shear system in accordance with an embodiment of the present invention.

Having described the constructional features of the present invention, a method in accordance with the invention will be described in conjunction with the process illustrated in FIG. 26. Generally, both the indexing and the advancement of the DIN rail by the DIN rail advancer 70 may be automated and controlled with a preprogrammed controller. At the output side of the shear die assembly 110, the funnel tray 124 may be coupled adjacent the shear die assembly 110 to direct sheared DIN rail away from the shear die assembly 110. Although not illustrated in the drawings, those skilled in the art will appreciate that the funnel tray 124 may be coupled to an actuator to move the tray between two positions. In this manner the funnel tray could be utilized to direct the sheared DIN rail into a finish receptacle and a scrap receptacle as appropriate.

In use, the cover 32 of the enclosure 30 is opened and the cassette 40 is loaded with DIN rail blanks. The controller is used to send a signal and control actuator 36, thereby actuating the cover 32 between an open and closed position 210. The cassette may be rotated or indexed to allow easy access to each DIN rail slot of the cassette 212. The controller is utilized to allow the user to decide whether more DIN rail is to be loaded 214. If more DIN rail is to be loaded the controller is used to rotate the cassette to expose empty slots of the cassette. Once the cassette is loaded, the user may utilize a controller to preset the quantity and desired lengths of the DIN rail to be cut 220. The controller includes an algorithm to determine the DIN rail cut sequence from the cut list to minimize the amount of DIN rail waste 222. The controller then controls the servo motor, DIN rail advancer, hydraulic shear actuator, and DIN rail feed to advance a length of DIN rail blank from the cassette through a die of a shear die assembly 224. The controller utilizes electrical signals from motion and proximity sensors to determine the position and amount of DIN rail advanced through the shear assembly 226. The controller then sends a signal to the shear actuator to engage or actuate the shear plate 228. Once the DIN rail blank is sheared the hydraulic actuator retracts and the shear assembly opens to allow advancement of DIN rail blank to a next desired length for shearing. The assembly autonomously advances the DIN rail blank and shears the DIN rail blank until a preselected number of DIN rail blanks are sheared. The controller may further control the advancement of DIN rail blanks by variable amounts to allow varied lengths of DIN rail blanks to pass through the shear die assembly prior to shearing the blank 232. The controller further controls the cog assembly to advance the DIN rail blank a desired amount through the shear die assembly. The controller determines whether the sequence of advancing and shearing the DIN rail continues at 230. When the controller determines there is no more DIN rail to shear, the cog assembly advances the extra DIN rail through the shear assembly to unload the cog assembly 236.

The process of loading DIN rail at 212 may further include unlocking the enclosure. Further the open/closed position of the cover will be monitored by a proximity sensor. Whenever the cassette is rotated the cover may first be closed. The controller may not be bypassed or overridden to allow rotation of the cassette the revolver gears are exposed. Further, a switch or emergency stop push button may be provided at the station or base 16 to allow a user to stop rotation of the cassette by a controller command. The revolver gears may be sized such that 10 DIN rail may be loaded before rotating the cassette. An indexing button may be provided to indicate to the controller that the cassette is ready to be advanced. The cassette may be sized to accept a total of at least 40 DIN rail blanks or 260 feet of DIN rail blanks. A gauge or sensor may be used to determine whether loaded DIN rail lengths comply with a standard or are out of specification. If out of spec, the controller may indicate to the user which slot in the cassette includes an out of spec blank.

The process of advancing DIN rail blanks from the cassette may further include a determination that the cassette is aligned and the DIN rail advancer is in the starting position. Air cylinder push the DIN rail through the revolver gear and towards the roller cog assembly. A proximity sensor communicates a signal to the controller corresponding to a position of air cylinder and DIN rail. If the sent signal is indicative of an extended cylinder, the cassette shaft will not rotate. If retracted, the cassette shaft will be allowed to rotate. Once rail has been fed through the gears and is no longer in contact with the revolver gears, the cassette shaft will be allowed to rotate. When the cassette includes 40 slots that shaft may rotate 9° via servo motor/gear box to expose each slot sequentially. The amount of time taken to empty a loaded cassette may vary from 15 minutes to 180 minutes, depending upon the cut lengths of the DIN rail. The cut lengths may range from 2" to 36".

The process of advancing the DIN rail blank through the cog assembly may further require advancing the DIN rail through the cog roller. The cog roller assembly may index DIN rail in one inch increments. The indexing may be monitored with a proximity sensor and the controller. Further, the controller may monitor the open and cutting position of the shear assembly with the use of proximity sensors. Advancing the cog roller advances the DIN rail by a predefined amount. As the cog roller advances the DIN rail, the blank moves through the cutting die until the desired length has advanced through the cutting die. A proximity switch may be utilized to ensure that the cutting die is open when the cog roller rotates.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An apparatus to repetitively shear DIN rail to selected lengths, said apparatus comprising:
    a shear die assembly that actuates between an open position and shearing position;
    a shear actuator paired with the shear die assembly to actuate a cutter punch of the shear die assembly to the shearing position;
    a cassette to contain at least two DIN rail blanks;
    a motor coupled to the cassette to rotate and index the cassette;
    a DIN rail advancer that advances DIN rail from the cassette towards a die of the shear die assembly; and
    a roller cog assembly to feed DIN rail through the shear die assembly.

2. The apparatus as recited in claim 1, further including a frame to support the apparatus, said frame having first and second spaced apart base sections.

3. The apparatus as recited in claim 2, wherein said shear die assembly is supported by the first base section.

4. The apparatus as recited in claim 3, wherein said motor is supported by the second base.

5. The apparatus as recited in claim 1, wherein said motor is of the servo driven type.

6. The apparatus as recited in claim 1, further including an enclosure that encompasses said DIN rail cassette; said enclosure having a cover that slides between an open and closed position.

7. The apparatus as recited in claim 1, wherein said indexing is automated.

8. The apparatus as recited in claim 1, wherein advancement of the DIN rail by the DIN rail advancer is automated.

9. The apparatus as recited in claim 1, further including a funnel tray coupled adjacent the shear die assembly to direct sheared DIN rail away from the shear die assembly.

10. An apparatus to repetitively shear DIN rail to selected lengths, said apparatus comprising:
    a frame having first and second spaced apart base sections;
    a shear die assembly supported by the first base section, wherein said shear die assembly actuates between an open position and shearing position;
    a shear actuator paired with the shear assembly to actuate a cutter of the shear assembly to the shearing position;
    a cassette to contain at least two DIN rail blanks;
    a motor supported by the second base and coupled to the cassette to rotate and index the cassette;

a DIN rail advancer that advances DIN rail from the cassette towards the shear die assembly; and a roller cog assembly to feed DIN rail through a die of the shear die assembly.

11. The apparatus as recited in claim 10, wherein said motor is of the servo driven type.

12. The apparatus as recited in claim 10, further including an enclosure that encompasses said DIN rail cassette; said enclosure having a cover that actuates between an open and closed position.

13. The apparatus as recited in claim 10, wherein said indexing is automated.

14. The apparatus as recited in claim 10, wherein advancement of the DIN rail by the DIN rail advancer is automated.

15. The apparatus as recited in claim 10, further including a funnel tray coupled adjacent the shear die assembly to direct sheared DIN rail away from the shear die assembly.

16. A method of repetitively shearing DIN rail to selected lengths, said method comprising the steps of:

loading DIN rail blanks into a DIN rail cassette having a capacity capable of containing at least two DIN rail blanks;

indexing the DIN rail cassette to allow more DIN rail blanks to be loaded into the DIN rail cassette;

advancing a length of DIN rail blank from the cassette with an automated DIN rail advancer, wherein the DIN rail blank is advanced from the DIN rail cassette through a die of a shear die assembly;

actuating a punch of the shear die assembly to shear the DIN rail blank; and autonomously advancing the DIN rail blank and shearing the DIN rail blank until a preselected number of DIN rail blanks are sheared.

17. The method as recited in claim 16 further including the step of controlling the advancement of DIN rail blanks through the die of the shear die assembly.

18. The method as recited in claim 17 wherein controlling the advancement of DIN rail blanks is variable to allow varied lengths of DIN rail blanks to pass through the shear die assembly prior to shearing the blank.

19. The method as recited in claim 18, wherein a cog assembly is controlled to advance the DIN rail blank a desired amount through the shear die assembly.

\* \* \* \* \*